US012531004B2

United States Patent

(12) United States Patent
Lin et al.

(10) Patent No.: US 12,531,004 B2
(45) Date of Patent: Jan. 20, 2026

(54) DISPLAY DEVICE AND GRAYSCALE COMPENSATION METHOD THEREOF

(71) Applicant: Novatek Microelectronics Corp., Hsinchu (TW)

(72) Inventors: Chan-Yi Lin, Hsinchu (TW); Yen-Tao Liao, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 25 days.

(21) Appl. No.: 18/513,622

(22) Filed: Nov. 19, 2023

(65) Prior Publication Data

US 2024/0339064 A1 Oct. 10, 2024

Related U.S. Application Data

(63) Continuation-in-part of application No. 18/297,626, filed on Apr. 9, 2023.

(51) Int. Cl.
*G09G 3/20* (2006.01)

(52) U.S. Cl.
CPC ... *G09G 3/2074* (2013.01); *G09G 2320/0223* (2013.01); *G09G 2320/0233* (2013.01);
(Continued)

(58) Field of Classification Search
CPC ......... G09G 3/2074; G09G 2320/0223; G09G 2320/0233; G09G 2320/0242; G09G 2320/041
See application file for complete search history.

(56) References Cited

U.S. PATENT DOCUMENTS 9,892,686 B2 2/2018 Xu et al.
11,735,147 B1 * 8/2023 Chou .................... G09G 5/391 345/76

(Continued)

FOREIGN PATENT DOCUMENTS

CN 104867455 8/2015
CN 110364111 10/2019

(Continued)

OTHER PUBLICATIONS

Machine translation Tiawan Office Action dated Apr. 10, 2014 (Year: 2014).*

(Continued)

*Primary Examiner* — Patrick N Edouard
*Assistant Examiner* — Joseph P Fox
(74) *Attorney, Agent, or Firm* — JCIPRNET

(57) ABSTRACT

The invention provides a display device and a grayscale compensation method thereof. The display device includes a data conversion circuit, a voltage drop estimation circuit, and a compensation circuit. The data conversion circuit converts a plurality of original grayscale data of a target pixel block into current data. The voltage drop estimation circuit converts the current data into transmission line voltage drop information of the target pixel block. The compensation circuit converts the transmission line voltage drop information into at least one pixel compensation value of the target pixel block and compensates the original grayscale data of the target pixel block using the at least one pixel compensation value to generate a plurality of compensated grayscale data of the target pixel block.

18 Claims, 15 Drawing Sheets

(52) U.S. Cl.
CPC ............... *G09G 2320/0242* (2013.01); *G09G 2320/041* (2013.01)

(56) References Cited

U.S. PATENT DOCUMENTS

| | | | | |
|---|---|---|---|---|
| 2006/0077142 | A1* | 4/2006 | Kwon | H03M 1/664 345/77 |
| 2015/0302817 | A1 | 10/2015 | Sun | |
| 2016/0019838 | A1 | 1/2016 | Park | |
| 2016/0189628 | A1 | 6/2016 | Choi | |
| 2017/0140705 | A1 | 5/2017 | Xu et al. | |
| 2020/0051508 | A1 | 2/2020 | Tan et al. | |
| 2022/0013068 | A1* | 1/2022 | Lin | G09G 3/3233 |
| 2023/0005409 | A1 | 1/2023 | Lee et al. | |
| 2023/0089942 | A1 | 3/2023 | Shi et al. | |

FOREIGN PATENT DOCUMENTS

| | | |
|---|---|---|
| CN | 111028784 | 4/2020 |
| CN | 111754942 | 10/2020 |
| CN | 113628589 | 11/2021 |

OTHER PUBLICATIONS

Machine Translation Tiawan Office Action dated Aug. 21, 2014 (Year: 2014).*
"Office Action of Taiwan Counterpart Application", issued on Apr. 10, 2024, p. 1-p. 7.
"Office Action of Taiwan Counterpart Application", issued on Aug. 21, 2024, p. 1-p. 5.

* cited by examiner

1610

| Lookup table | 0 | 1 | 2 |
|---|---|---|---|
| 0 | comp(0,0) | comp(1,0) | comp(2,0) |
| 1 | comp(0,1) | comp(1,1) | comp(2,1) |
| 2 | comp(0,2) | comp(1,2) | comp(2,2) |
| 3 | comp(0,3) | comp(1,3) | comp(2,3) |

×

1620

| Voltage drop ratio | 0 | 1 | 2 |
|---|---|---|---|
| 0 | Ratio(0,0) | Ratio(1,0) | Ratio(2,0) |
| 1 | Ratio(0,1) | Ratio(1,1) | Ratio(2,1) |
| 2 | Ratio(0,2) | Ratio(1,2) | Ratio(2,2) |
| 3 | Ratio(0,3) | Ratio(1,3) | Ratio(2,3) |

→

1630

| Updated lookup table | 0 | 1 | 2 |
|---|---|---|---|
| 0 | comp(0,0)' | comp(1,0)' | comp(2,0)' |
| 1 | comp(0,1)' | comp(1,1)' | comp(2,1)' |
| 2 | comp(0,2)' | comp(1,2)' | comp(2,2)' |
| 3 | comp(0,3)' | comp(1,3)' | comp(2,3)' |

FIG. 16

DISPLAY DEVICE AND GRAYSCALE COMPENSATION METHOD THEREOF

CROSS-REFERENCE TO RELATED APPLICATION

This application is a continuation-in-part application of and claims the priority benefit of a prior application Ser. No. 18/297,626, filed on Apr. 9, 2023. The entirety of the above-mentioned patent application is hereby incorporated by reference herein and made a part of this specification.

BACKGROUND OF THE INVENTION

Field of the Invention

The invention relates to a panel display technique. Particularly, the invention relates to a display device and a grayscale compensation method thereof.

Description of Related Art

A source driver may drive a plurality of data lines of a display panel. Due to the impedance of the data lines, there may be the phenomenon of different voltage drops (also referred to as IR drops) at different positions of the data lines. For example, among a plurality of sub-pixels connected to the same data line, there may be a more significant voltage drop phenomenon in a sub-pixel farther away from the source driver (the signal source), and there may be a slighter voltage drop phenomenon in a sub-pixel closer to the source driver.

In addition, a plurality of data lines of a large-sized display panel are typically connected to a plurality of source drivers. A power circuit may supply power to the source drivers via a source driver power line. Therefore, due to the impedance of the source driver power line, there may also be the phenomenon of different voltage drops at different positions of the source driver power line. For example, among a plurality of source drivers connected to the same source driver power line, there may be a more significant voltage drop phenomenon in a source driver farther away from the power circuit (the power source), and there may be a slighter voltage drop phenomenon in a source driver closer to the power circuit.

SUMMARY OF THE INVENTION

The invention provides a display device and a grayscale compensation method thereof to compensate the voltage drop of a transmission line.

In an embodiment of the invention, a display device includes a data conversion circuit, a voltage drop estimation circuit, and a compensation circuit. The data conversion circuit is configured to convert a plurality of original grayscale data of a target pixel block into current data. The voltage drop estimation circuit is coupled to the data conversion circuit to receive the current data of the target pixel block. The voltage drop estimation circuit is configured to convert the current data into transmission line voltage drop information of the target pixel block. The compensation circuit is coupled to the voltage drop estimation circuit to receive the transmission line voltage drop information of the target pixel block. The compensation circuit is configured to convert the transmission line voltage drop information into at least one pixel compensation value of the target pixel block and compensate the original grayscale data of the target pixel block using the at least one pixel compensation value to generate a plurality of compensated grayscale data of the target pixel block. The data conversion circuit generates a plurality of color current average values according to the original grayscale data of the target pixel block, calculates the color current average values according to a panel factor parameter to generate a plurality of adjusted color current average values, and generates the current data of the target pixel block according to the adjusted color current average values.

In an embodiment of the invention, a grayscale compensation method includes: converting a plurality of original grayscale data of a target pixel block into current data via a data conversion circuit of a display device; converting the current data into transmission line voltage drop information of the target pixel block via a voltage drop estimation circuit of the display device; converting the transmission line voltage drop information into at least one pixel compensation value of the target pixel block via a compensation circuit of the display device; and compensating the original grayscale data of the target pixel block using the at least one pixel compensation value via the compensation circuit to generate a plurality of compensated grayscale data of the target pixel block. The step of converting the plurality of original grayscale data of the target pixel block into the current data includes: generating a plurality of color current average values according to the original grayscale data of the target pixel block; calculating the color current average values according to a panel factor parameter to generate a plurality of adjusted color current average values; and generating the current data of the target pixel block according to the adjusted color current average values.

Based on the above, the display device of the above embodiments may convert the original grayscale data D1 into the current data, then convert the current data into the transmission line voltage drop information, and then convert the transmission line voltage drop information into the pixel compensation value, and compensate the original grayscale data D1 using the pixel compensation value. Therefore, the display device may compensate for the voltage drop of the transmission line. Moreover, via the panel factor parameter, dynamic calculation of the load on the transmission line and the corresponding compensation value, and the use of interpolation/extrapolation to extend the compensation value to the four corner points of the pixel block, the compensation of voltage drop phenomenon on the panel may be further implemented.

In order to make the aforementioned features and advantages of the disclosure more comprehensible, embodiments accompanied with figures are described in detail below.

BRIEF DESCRIPTION OF THE DRAWINGS

FIG. 16 is a schematic diagram of a load compensation lookup table, a voltage drop ratio table, and an updated lookup table according to the second embodiment of the invention.

DESCRIPTION OF THE EMBODIMENTS

Figure 1:
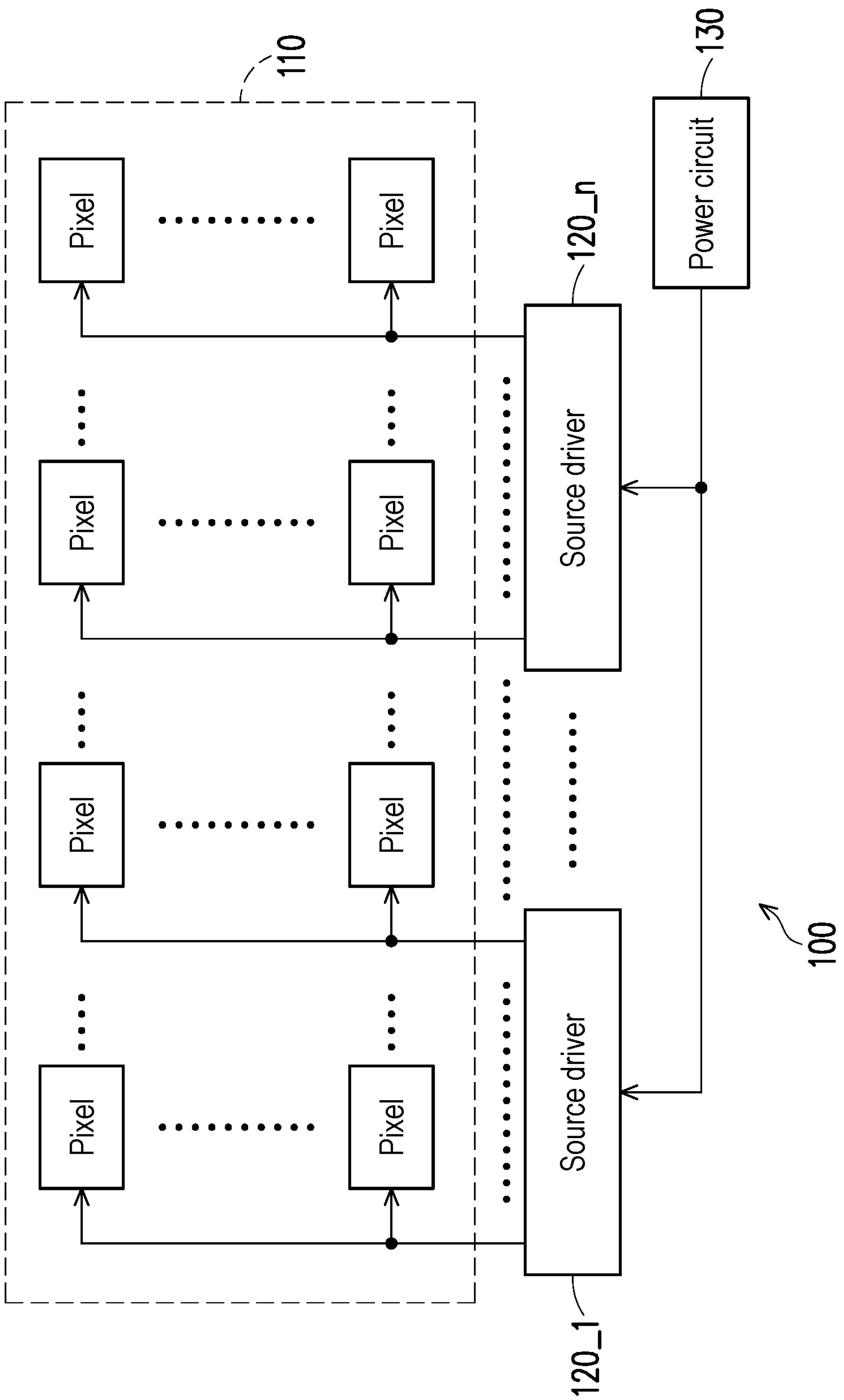
FIG. 1 is a circuit block diagram of a display device according to an embodiment of the invention.

The term "coupled (or connected)" used throughout the specification (including the claims) of the present application may refer to any direct or indirect connection means. For example, if it is herein described that a first device is coupled (or connected) to a second device, it should be interpreted that the first device may be directly connected to the second device, or the first device may be indirectly connected to the second device via other devices or some connection means. Terms such as "first" and "second" mentioned throughout the specification (including the claims) of the present application are used to name elements or to distinguish between different embodiments or scopes, and are not used to limit the upper bound or the lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic circuit block diagram of a display device 100 according to an embodiment of the invention. The display device 100 shown in FIG. 1 includes a display panel 110, source drivers 120_1 to **120_*n*, and a power circuit 130. All pixels of the display panel 110 may be divided into a plurality of pixel blocks, wherein each of the pixel blocks contains a plurality of pixels. The source drivers 120_1 to 120_*n* may drive a plurality of data lines (transmission lines) of the display panel 110**. Due to the impedance of the data lines, there may be the phenomenon of different voltage drops (also referred to as IR drops) at different positions of the data lines. For example, among a plurality of pixels connected to the same data line, there may be a more significant voltage drop phenomenon in a subpixel farther away from the source driver (the signal source), and there may be a slighter voltage drop phenomenon in a sub-pixel closer to the source driver.

Based on actual application, the number n of the source drivers 120_1 to **120_*n* may be any integer. The plurality of source drivers 120_1 to 120_*n* may drive the large-sized display panel 110. The power circuit 130 may supply power to the source drivers 120_1 to 120_*n* via a source driver power line (a transmission line). Due to the impedance of the source driver power line, there may also be the phenomenon of different voltage drops at different positions of the source driver power line. For example, among the plurality of source drivers 120_1 to 120_*n* connected to the same source driver power line, there may be a more significant voltage drop phenomenon in a source driver farther away from the power circuit 130 (the power source), and there may be a slighter voltage drop phenomenon in a source driver closer to the power circuit 130**.

Figure 2:
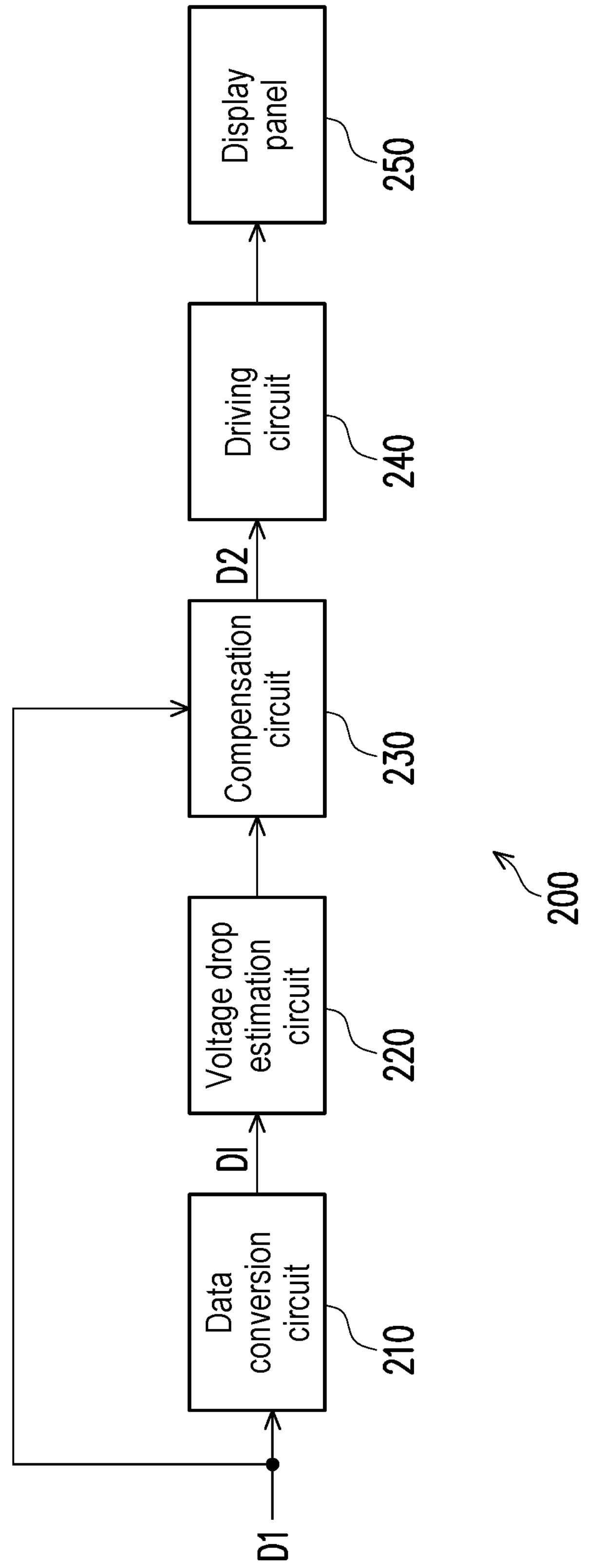
FIG. 2 is a schematic circuit block diagram of a display device 200 according to an embodiment of the invention.

FIG. 2 is a schematic circuit block diagram of a display device 200 according to an embodiment of the invention. The display device 200 shown in FIG. 2 includes a data conversion circuit 210, a voltage drop estimation circuit 220, a compensation circuit 230, a driving circuit 240, and a display panel 250. The driving circuit 240 may drive a plurality of data lines (not shown in FIG. 2) of the display panel 250. Reference may be made to the relevant description of the display device 100 shown in FIG. 1 for the display device 200 shown in FIG. 2, reference may be made to the relevant description of the source drivers 120_1 to **120_*n* shown in FIG. 1 for the driving circuit 240 shown in FIG. 2, and reference may be made to the relevant description of the display panel 110 shown in FIG. 1 for the display panel 250 shown in FIG. 2**, which are thus not repeated herein.

Based on actual design, in some embodiments, the data conversion circuit 210, the voltage drop estimation circuit 220, the compensation circuit 230, and the driving circuit 240 may be integrated in a source driver integrated circuit. In some other embodiments, the driving circuit 240 may be integrated in a source driver integrated circuit, and the data conversion circuit 210, the voltage drop estimation circuit 220, and the compensation circuit 230 may be implemented as other integrated circuits. In some embodiments, the data conversion circuit 210, the voltage drop estimation circuit 220, and the compensation circuit 230 may be integrated in a timing controller or other integrated circuits.

According to different designs, in some embodiments, the data conversion circuit 210, the voltage drop estimation circuit 220, and (or) the compensation circuit 230 may be implemented as hardware circuits. In some other embodiments, the data conversion circuit 210, the voltage drop estimation circuit 220, and (or) the compensation circuit 230 may be implemented as firmware, software (i.e., programs), or a combination of the two. In some embodiments, the data conversion circuit 210, the voltage drop estimation circuit 220, and (or) the compensation circuit 230 may be implemented as a combination of a plurality of hardware, firmware, and software.

In terms of hardware form, the data conversion circuit 210, the voltage drop estimation circuit 220, and (or) the compensation circuit 230 may be implemented as logic circuits on an integrated circuit. For example, the relevant functions of the data conversion circuit 210, the voltage drop estimation circuit 220, and (or) the compensation circuit 230 may be implemented as various logic blocks, modules, and circuits in one or a plurality of controllers, microcontrollers, microprocessors, application-specific integrated circuits (ASICs), digital signal processors (DSPs), field-programmable gate arrays (FPGAs), central processing units (CPUs), and/or other processing units. The relevant functions of the data conversion circuit 210, the voltage drop estimation circuit 220, and (or) the compensation circuit 230 may be implemented as hardware circuits, such as various logic blocks, modules, and circuits in an integrated circuit, by utilizing a hardware description language (e.g., Verilog HDL or VHDL) or other suitable programming languages.

In terms of software form and/or firmware form, the relevant functions of the data conversion circuit 210, the voltage drop estimation circuit 220, and (or) the compensation circuit 230 may be implemented as programming codes. For example, the data conversion circuit 210, the voltage drop estimation circuit 220, and (or) the compensation circuit 230 are implemented by utilizing a general programming language (e.g., C, C++, or combinatorial language) or other suitable programming languages. The programming codes may be recorded/stored in a "non-transitory machine-readable storage medium". In some embodiments, the non-transitory machine-readable storage medium includes, for example, a semiconductor memory and/or a storage device. The semiconductor memory includes a memory card, a read-only memory (ROM), a flash memory, a programmable logic circuit, or other semiconductor memories. The storage device includes a tape, a disk, a hard disk drive (HDD), a solid-state drive (SSD), or other storage devices. An electronic equipment (e.g., a computer, a CPU, a controller, a microcontroller, or a microprocessor) may read and execute the programming codes from the non-transitory machine-readable storage medium so as to implement the relevant functions of the data conversion circuit 210, the voltage drop estimation circuit 220, and (or) the compensation circuit 230. Alternatively, the programming codes may be provided to the electronic equipment via any transmission medium (such as a communication network or broadcast waves, etc.) The communication network is, for example, the Internet, a wired communication network, a wireless communication network, or other communication media.

Figure 3:
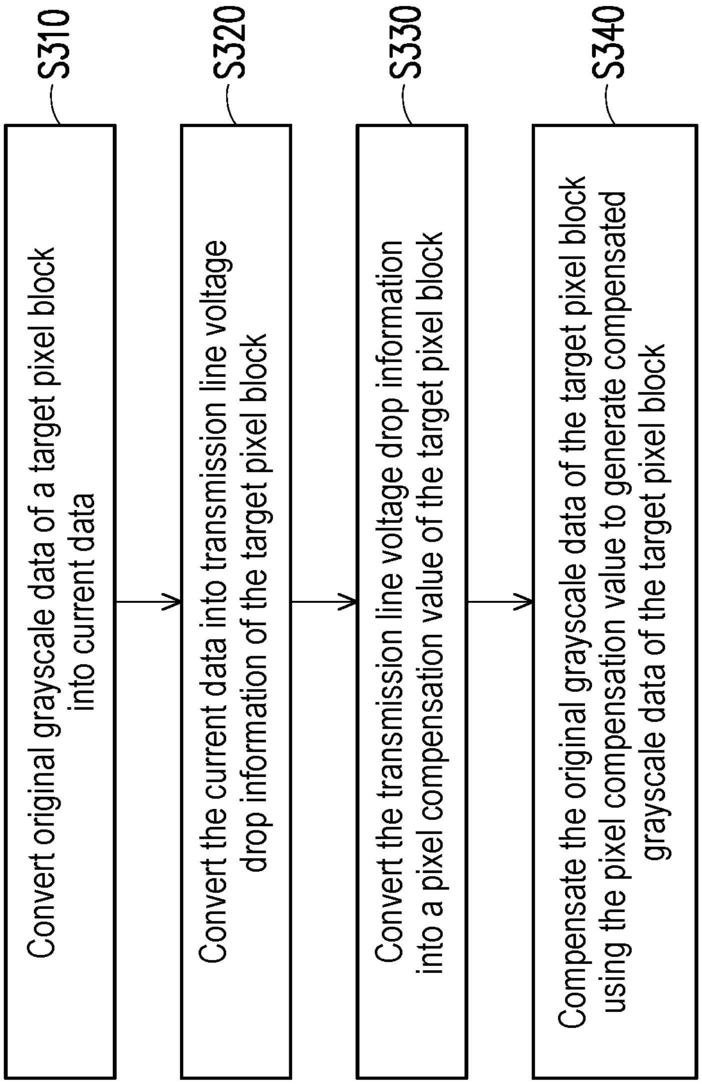
FIG. 3 is a schematic flowchart of a grayscale compensation method of a display device according to an embodiment of the invention.

FIG. 3 is a schematic flowchart of a grayscale compensation method of a display device according to an embodiment of the invention. Please refer to FIG. 2 and FIG. 3. In step S310, the data conversion circuit 210 may convert a plurality of original grayscale data D1 of a target pixel block into current data DI corresponding to the target pixel block. For example, the data conversion circuit 210 may convert the plurality of original grayscale data D1 of the target pixel block into a plurality of sub-pixel current values corresponding to a plurality of sub-pixels of the target pixel block based on one or a plurality of grayscale-to-current conversion curves. The grayscale-to-current conversion curves may be set depending on actual design. For example, in an embodiment, the grayscale-to-current conversion curves may be the well-known Gamma 2.2 curve or other conversion curves.

Figure 4:
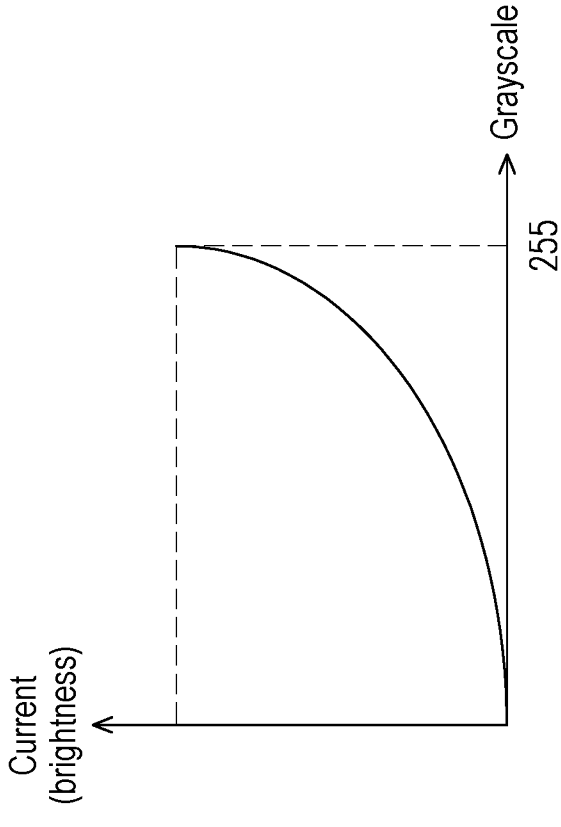
FIG. 4 is a schematic diagram of a grayscale-to-current conversion curve shown according to another embodiment of the invention.

FIG. 4 is a schematic diagram of a grayscale-to-current conversion curve shown according to another embodiment of the invention. The horizontal axis shown in FIG. 4 represents grayscale, and the vertical axis shown in FIG. 4 represents current (brightness). In the embodiment shown in FIG. 4, although it is assumed that the maximum grayscale is 255, the actual maximum grayscale may be set to other grayscale values depending on actual design. The grayscale-to-current conversion curve shown in FIG. 4 is dependent on the display characteristics of the display panel 250.

Figure 5:
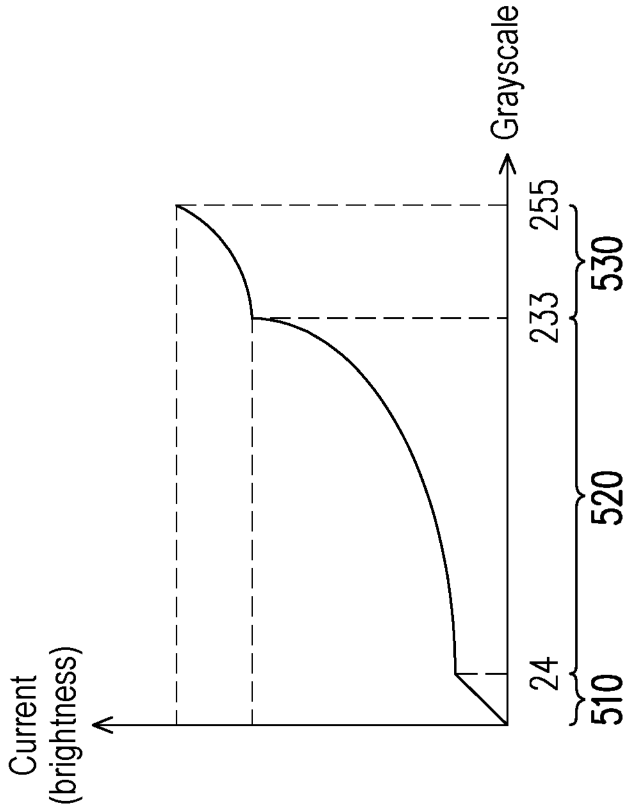
FIG. 5 is a schematic diagram of a grayscale-to-current conversion curve shown according to another embodiment of the invention.

FIG. 5 is a schematic diagram of a grayscale-to-current conversion curve shown according to another embodiment of the invention. The horizontal axis shown in FIG. 5 represents grayscale, and the vertical axis shown in FIG. 5 represents current (brightness). In FIG. 5, although it is assumed that the maximum grayscale is 255, the actual maximum grayscale may be set to other grayscale values depending on actual design. In the embodiment shown in FIG. 5, the range of the grayscale data may be divided into a plurality of intervals (e.g., intervals 510, 520, and 530 shown in FIG. 5). Although the embodiment shown in FIG. 5 assumes that the dividing points of the intervals are 24 and 233, the actual dividing points and the number of intervals may be set according to actual design.

In the embodiment shown in FIG. 5, there are different grayscale-to-current conversion curves in different intervals. For example (but not limited thereto), the grayscale-to-current conversion curve in the interval 510 is a linear curve, the grayscale-to-current conversion curve in the interval 530 is the Gamma 2.2 curve, and the grayscale-to-current conversion curve in the interval 520 is a conversion curve other than the Gamma 2.2 curve. For example (but not limited thereto), the grayscale-to-current conversion curve in the interval 520 may be Formula (1) below. In Formula (1), I represents the sub-pixel current value corresponding to the sub-pixel, U represents the upper boundary grayscale value (e.g., 233 or other real numbers) of the interval 520, L represents the lower boundary grayscale value (e.g., 24 or other real numbers) of the interval 520, M represents the maximum grayscale value (e.g., 255 or other real numbers) of the range of the original grayscale data D1, and D1 represents the original grayscale data of the sub-pixel. The data conversion circuit 210 may convert the plurality of original grayscale data of the target pixel block into a plurality of sub-pixel current values corresponding to a plurality of sub-pixels of the target pixel block based on the plurality of grayscale-to-current conversion curves shown in FIG. 5.

$$I=[(U-L)/M]*D1+L \quad \text{Formula (1)}$$

With reference to FIG. 2 and FIG. 3, the data conversion circuit 210 may calculate the current data DI corresponding to the target pixel block using the plurality of sub-pixel current values of the target pixel block in step S310. For example, the data conversion circuit 210 may perform averaging calculation on the plurality of sub-pixel current values of the target pixel block according to color to generate a plurality of color current average values of the target pixel block. The data conversion circuit 210 may perform weighting calculation on the plurality of color current average values of the target pixel block to generate the current data DI of the target pixel block.

It is assumed that the target pixel block includes a plurality of red sub-pixels, a plurality of green sub-pixels, and a plurality of blue sub-pixels. The data conversion circuit 210 may average red sub-pixel current values to generate a red current average value. The data conversion circuit 210 may average green sub-pixel current values to generate a green current average value. The data conversion circuit 210 may average blue sub-pixel current values to generate a blue current average value. The data conversion circuit 210 may perform weighting calculation on the red current average value, the green current average value, and the blue current average value of the target pixel block to generate the current data DI corresponding to the target pixel block. For example (but not limited thereto), the data conversion circuit 210 may calculate Formula (2) below. In particular, DI represents the current data corresponding to the target pixel block, Wr represents the red weight, R represents the red current average value, Wg represents the green weight, G represents the green current average value, Wb represents the blue weight, B represents the blue current average value, and M represents the maximum grayscale value (e.g., 255 or other real numbers). The values of the red weight Wr, the green weight Wg, and the blue weight Wb may be set depending on actual design.

$$DI=(W_r*R+Wg*G+Wb*B)/M \qquad \text{Formula (2)}$$

With reference to FIG. 2 and FIG. 3, the voltage drop estimation circuit 220 is coupled to the data conversion circuit 210 to receive the current data DI of the target pixel block. In step S320, the voltage drop estimation circuit 220 may convert the current data DI into transmission line voltage drop information of the target pixel block. Assuming that the transmission line of the display panel 250 corresponds to a plurality of pixel groups (e.g., all pixel blocks in one pixel block column) of the display panel 250, the data conversion circuit 210 may provide the current data DI of all pixel blocks of one pixel block column to the voltage drop estimation circuit 220. The voltage drop estimation circuit 220 may accumulate the current data DI of the pixel blocks of the same pixel block column along the reverse transmission direction of the transmission line to learn the current accumulation value corresponding to each of the pixel blocks. The voltage drop estimation circuit 220 may count the current accumulation values of the pixel blocks of the same pixel block column along the transmission direction of the transmission line to obtain a voltage drop characteristic value (an IR drop characteristic value) corresponding to each of the pixel blocks. The voltage drop estimation circuit 220 may calculate a voltage drop ratio (the transmission line voltage drop information) using the voltage drop characteristic value of the target pixel block and a reference voltage drop characteristic value of the target pixel block.

Figure 6:
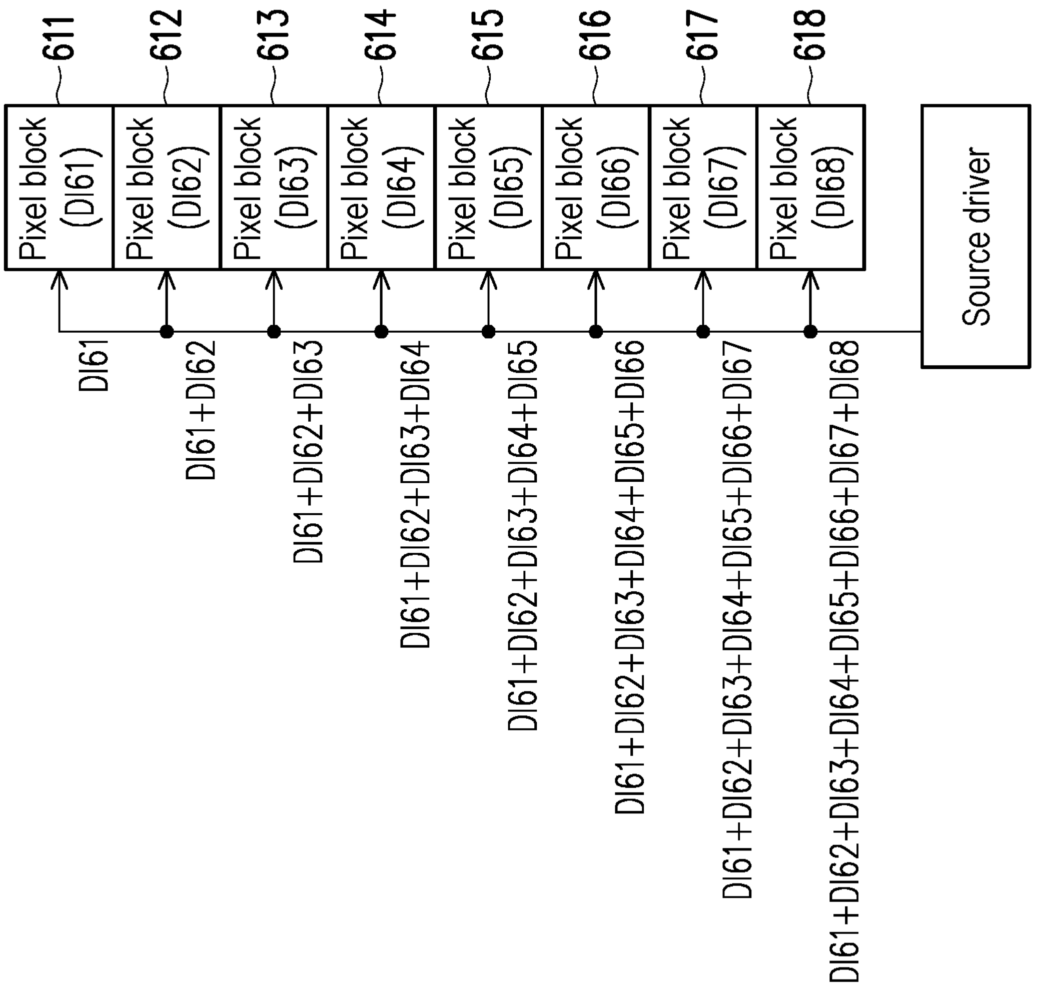
FIG. 6 is a schematic diagram of one pixel block column shown according to an embodiment of the invention.

FIG. 6 is a schematic diagram of one pixel block column shown according to an embodiment of the invention. The number of pixel blocks of one pixel block column may be determined depending on actual design. For example, the pixel block column shown in FIG. 6 includes pixel blocks 611, 612, 613, 614, 615, 616, 617, and 618. In a case where the transmission line is a data line, a plurality of pixel groups corresponding to the transmission line are different pixel blocks in one same column (e.g., the pixel blocks 611 to 618 shown in FIG. 6) of the display panel, and the voltage drop ratio may include a 1D (one-dimensional) voltage drop ratio. It is assumed that the current data DI of the pixel blocks 611 to 618 are respectively DI61, DI62, DI63, DI64, DI65, DI66, DI67, and DI68. The voltage drop estimation circuit 220 may accumulate current data DI61 to DI68 of the pixel blocks 611 to 618 of the same pixel block column along the reverse transmission direction of the transmission line (the data line) to learn the current accumulation value corresponding to each of the pixel blocks. The current accumulation value of the pixel block 611 shown in FIG. 6 is CA61=DI61. The current accumulation value of the pixel block 612 shown in FIG. 6 is CA62=CA61+DI62. The current accumulation value of the pixel block 613 shown in FIG. 6 is CA63=CA62+DI63. The current accumulation value of the pixel block 614 shown in FIG. 6 is CA64=CA63+DI64. The current accumulation value of the pixel block 615 shown in FIG. 6 is CA65=CA64+DI65. The current accumulation value of the pixel block 616 shown in FIG. 6 is CA66=CA65+DI66. The current accumulation value of the pixel block 617 shown in FIG. 6 is CA67=CA66+DI67. The current accumulation value of the pixel block 618 shown in FIG. 6 is CA68=CA67+DI68.

The voltage drop estimation circuit 220 may count the current accumulation values of the pixel blocks 611 to 618 of the same pixel block column along the transmission direction of the transmission line to learn the voltage drop characteristic value (the IR drop characteristic value) corresponding to each of the pixel blocks. The voltage drop characteristic value of the pixel block 618 is IRD68=CA68. The voltage drop characteristic value of the pixel block 617 is IRD67=IRD68+CA67. The voltage drop characteristic value of the pixel block 616 is IRD66=IRD67+CA66. The voltage drop characteristic value of the pixel block 615 is IRD65=IRD66+CA65. The voltage drop characteristic value of the pixel block 614 is IRD64=IRD65+CA64. The voltage drop characteristic value of the pixel block 613 is IRD63=IRD64+CA63. The voltage drop characteristic value of the pixel block 612 is IRD62=IRD63+CA62. The voltage drop characteristic value of the pixel block 611 is IRD61=IRD62+CA61.

The voltage drop estimation circuit 220 may calculate a 1D voltage drop ratio (the transmission line voltage drop information) using the voltage drop characteristic value of the target pixel block and a reference voltage drop characteristic value of the target pixel block. The reference voltage drop characteristic value may be set depending on actual design. For example, the reference voltage drop characteristic value includes a maximum voltage drop characteristic value of the target pixel block in a case where each of the sub-pixels of all of the pixel blocks corresponding to the transmission line (the data line) is a maximum grayscale. It is assumed that the maximum voltage drop characteristic values of the pixel blocks 611 to 618 shown in FIG. 6 are respectively IRDM61, IRDM62, IRDM63, IRDM64, IRDM65, IRDM66, IRDM67, and IRDM68. The 1D voltage drop ratio (the transmission line voltage drop information) of the pixel block 611 is R1D61=IRD61/IRDM61. By analogy, the 1D voltage drop ratio (the transmission line voltage drop information) of the pixel block 618 is R1D68=IRD68/IRDM68.

In the scenario shown in FIG. 6, the transmission line voltage drop information of different pixel blocks in the same pixel block column is taken into consideration, that is, the transmission line voltage drop in the vertical direction of the display panel is taken into consideration. Analogy of the same concept may be made to the transmission line voltage drop in the horizontal direction of the display panel. In a case where the transmission line is a source driver power line, "pixel groups corresponding to the transmission line" may be a plurality of pixel block columns of the display panel, and the voltage drop ratio may include a 2D (two-dimensional) voltage drop ratio.

Figure 7:
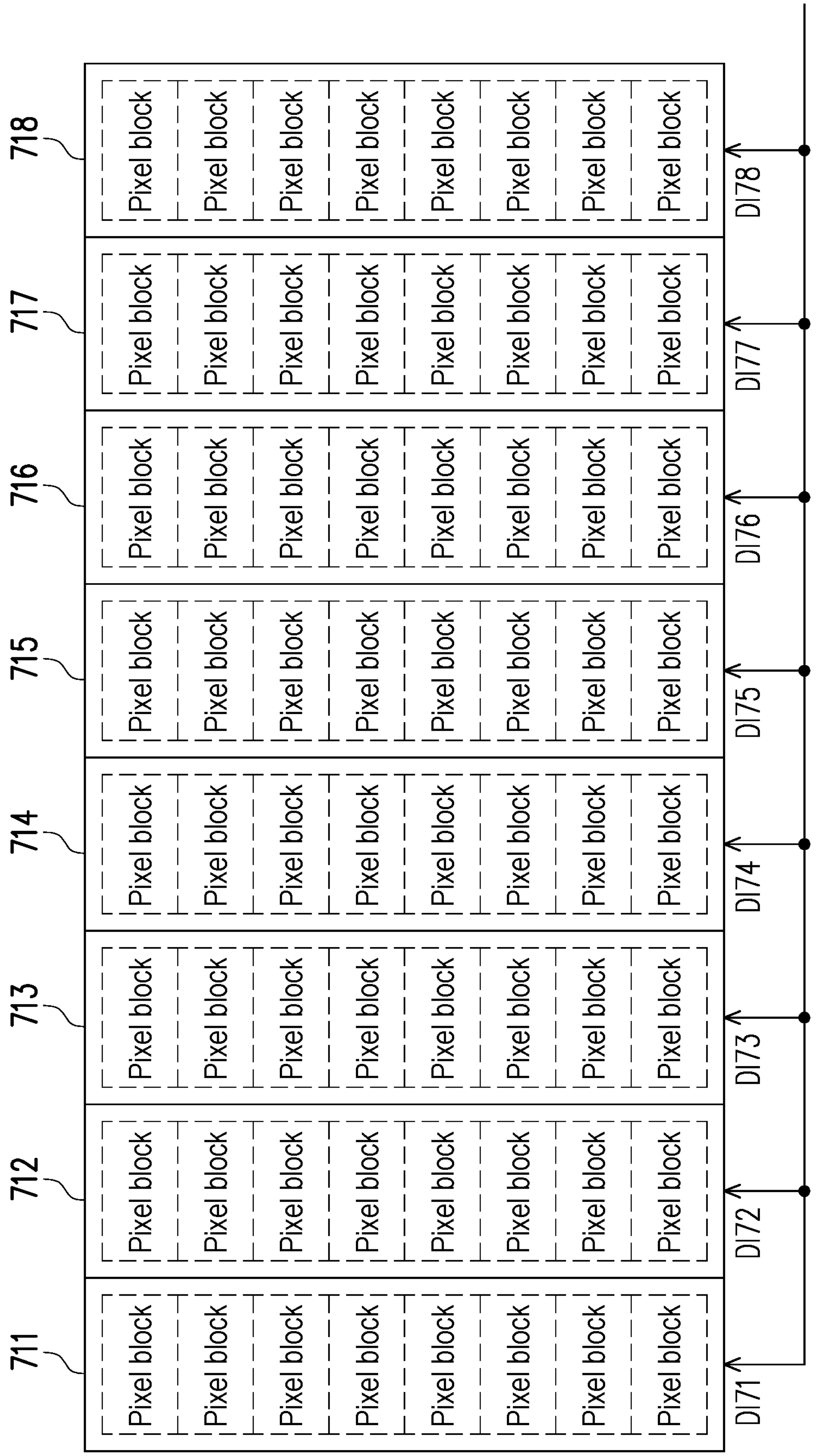
FIG. 7 is a schematic diagram of a plurality of pixel block columns shown according to an embodiment of the invention.

FIG. 7 is a schematic diagram of a plurality of pixel block columns shown according to an embodiment of the invention. The number of pixel block columns of one display panel may be determined depending on actual design. For example, the display panel shown in FIG. 7 includes pixel block columns 711, 712, 713, 714, 715, 716, 717, and 718. Analogy may be made with reference to the relevant description of the pixel block column shown in FIG. 6 for any one of the pixel block columns 711 to 718 shown in FIG. 7, which are thus not repeated herein. The voltage drop estimation circuit 220 may accumulate the current data DI of all pixel blocks of the same pixel block column (see the description of the embodiment shown in FIG. 6 for details) to learn the current data of the pixel block column. It is assumed that current data of the pixel block columns 711 to 718 are respectively DI71, DI72, DI73, DI74, DI75, DI76, DI77, and DI78. The voltage drop estimation circuit 220 may accumulate the current data DI71 to DI78 of the pixel block columns 711 to 718 along the reverse transmission direction of the transmission line (the source driver power line) to learn the current accumulation value corresponding to each of the pixel block columns. The current accumulation value of the pixel block column 711 shown in FIG. 7 is CA71=DI71. The current accumulation value of the pixel block column 712 shown in FIG. 7 is CA72=CA71+DI72. The current accumulation value of the pixel block column 713 shown in FIG. 7 is CA73=CA72+DI73. The current accumulation value of the pixel block column 714 shown in FIG. 7 is CA74=CA73+DI74. The current accumulation value of the pixel block column 715 shown in FIG. 7 is CA75=CA74+DI75. The current accumulation value of the pixel block column 716 shown in FIG. 7 is CA76=CA75+DI76. The current accumulation value of the pixel block column 717 shown in FIG. 7 is CA77=CA76+DI77. The current accumulation value of the pixel block column 718 shown in FIG. 7 is CA78=CA77+DI78.

The voltage drop estimation circuit 220 may count the current accumulation values of the pixel block columns 711 to 718 along the transmission direction of the transmission line to learn the voltage drop characteristic value corresponding to each of the pixel block columns. The voltage drop characteristic value of the pixel block column 718 is IRD78=CA78. The voltage drop characteristic value of the pixel block column 717 is IRD77=IRD78+CA77. The voltage drop characteristic value of the pixel block column 716 is IRD76=IRD77+CA76. The voltage drop characteristic value of the pixel block column 715 is IRD75=IRD76+CA75. The voltage drop characteristic value of the pixel block column 714 is IRD74=IRD75+CA74. The voltage drop characteristic value of the pixel block column 713 is IRD73=IRD74+CA73. The voltage drop characteristic value of the pixel block column 712 is IRD72=IRD73+CA72. The voltage drop characteristic value of the pixel block column 711 is IRD71=IRD72+CA71.

The voltage drop estimation circuit 220 may calculate a 2D voltage drop ratio (the transmission line voltage drop information) using the voltage drop characteristic value of the target pixel block column and a reference voltage drop characteristic value of the target pixel block column. The reference voltage drop characteristic value of the target pixel block column may be set depending on actual design. For example, the reference voltage drop characteristic value of the target pixel block column includes a maximum voltage drop characteristic value of the target pixel block column in a case where each of the sub-pixels of the target pixel block column is a maximum grayscale. It is assumed that the maximum voltage drop characteristic values of the pixel block columns 711 to 718 shown in FIG. 7 are respectively IRDM71, IRDM72, IRDM73, IRDM74, IRDM75, IRDM76, IRDM77, and IRDM78. The 2D voltage drop ratio (the transmission line voltage drop information) of the pixel block column 711 is R2D71=IRD71/IRDM71. By analogy, the 2D voltage drop ratio (the transmission line voltage drop information) of the pixel block column 718 is R2D78=IRD78/IRDM78.

With reference to FIG. 2 and FIG. 3, the compensation circuit 230 is coupled to the voltage drop estimation circuit 220 to receive the transmission line voltage drop information of the target pixel block (and/or the transmission line voltage drop information of the target pixel block column). In step S330, the compensation circuit 230 may convert the transmission line voltage drop information into at least one pixel compensation value of the target pixel block (and/or at least one pixel compensation value of the target pixel block column). For example (but not limited thereto), the compensation circuit 230 may obtain at least one first compensation value corresponding to the target pixel block from at least one lookup table based on the position of the target pixel block. The compensation circuit 230 may calculate a second compensation value of the target pixel block using the first compensation value and the transmission line voltage drop information of the target pixel block. The compensation circuit 230 may convert the second compensation value into the pixel compensation value of the target pixel block. The compensation circuit 230 may compensate the original grayscale data of the target pixel block using the pixel compensation value, so as to generate compensated grayscale data D2 of the target pixel block.

As an example, the at least one lookup table may include a maximum (Max) loading condition lookup table and a minimum (Min) loading condition lookup table. The first compensation value corresponding to the target pixel block includes a maximum loading condition compensation value and a minimum loading condition compensation value, and the transmission line voltage drop information of the target pixel block includes the 1D voltage drop ratio and the 2D voltage drop ratio corresponding to the target pixel block. The content of the maximum loading condition lookup table may be ideal compensation values (the maximum loading condition compensation values) corresponding to pixel blocks at different positions in a case where all pixels of the display panel emit light at the maximum grayscale. The content of the minimum loading condition lookup table may be ideal compensation values (the minimum loading condition compensation values) corresponding to pixel blocks at different positions in a case where all pixels of the display panel emit light at the minimum grayscale. The compensation circuit 230 may obtain the maximum loading condition compensation value corresponding to the target pixel block from the maximum loading condition lookup table based on the position of the target pixel block at the display panel. In addition, the compensation circuit 230 may obtain the minimum loading condition compensation value corresponding to the target pixel block from the minimum loading condition lookup table based on the position of the target pixel block.

The compensation circuit 230 may calculate the second compensation value of the target pixel block using the maximum loading condition compensation value, the minimum loading condition compensation value, the 1D voltage drop ratio, and the 2D voltage drop ratio. For example (but not limited thereto), the compensation circuit 230 may calculate Formula (3) below. In Formula (3), Comp represents the second compensation value, Cmin represents the minimum loading condition compensation value, Cmax represents the maximum loading condition compensation value, RID represents the 1D voltage drop ratio, and R2D represents the 2D voltage drop ratio.

$$\text{Comp}=C\text{min}+(C\text{min}-C\text{max})*R1D*R2D \qquad \text{Formula (3)}$$

In some embodiments, the compensation circuit 230 may use the second compensation value as the at least one pixel compensation value. In some other embodiments, the compensation circuit 230 may convert the second compensation value of the target pixel block into the at least one pixel compensation value of the target pixel block. Please refer to FIG. 2 and FIG. 3. In step S340, the compensation circuit 230 may compensate the original grayscale data of the target pixel block using the at least one pixel compensation value, so as to generate the compensated grayscale data D2 of the target pixel block. The compensation circuit 230 may provide the compensated grayscale data D2 to the driving circuit 240 so as to drive the display panel 250 to display an image.

As an example, in some embodiments, the at least one pixel compensation value includes a plurality of sub-pixel compensation values corresponding to different sub-pixels in the target pixel block. The compensation circuit 230 may convert the second compensation value of the target pixel block into the sub-pixel compensation value corresponding to each of a plurality of edge sub-pixels of the target pixel block. For example (but not limited thereto), the compensation circuit 230 may perform interpolation/extrapolation using the second compensation value of the target pixel block and the second compensation value of an adjacent pixel block adjacent to the target pixel block to calculate the second compensation values of the edge sub-pixels (e.g., sub-pixels at four corners) of the target pixel block. The compensation circuit 230 may perform interpolation/extrapolation using the sub-pixel compensation values of the edge sub-pixels to calculate the sub-pixel compensation value corresponding to each of the other sub-pixels in the target pixel block. Therefore, the compensation circuit 230 compensates the original grayscale data of different sub-pixels using the pixel compensation values corresponding to different sub-pixels, so as to generate the compensated grayscale data D2 of the sub-pixels.

Figure 8:
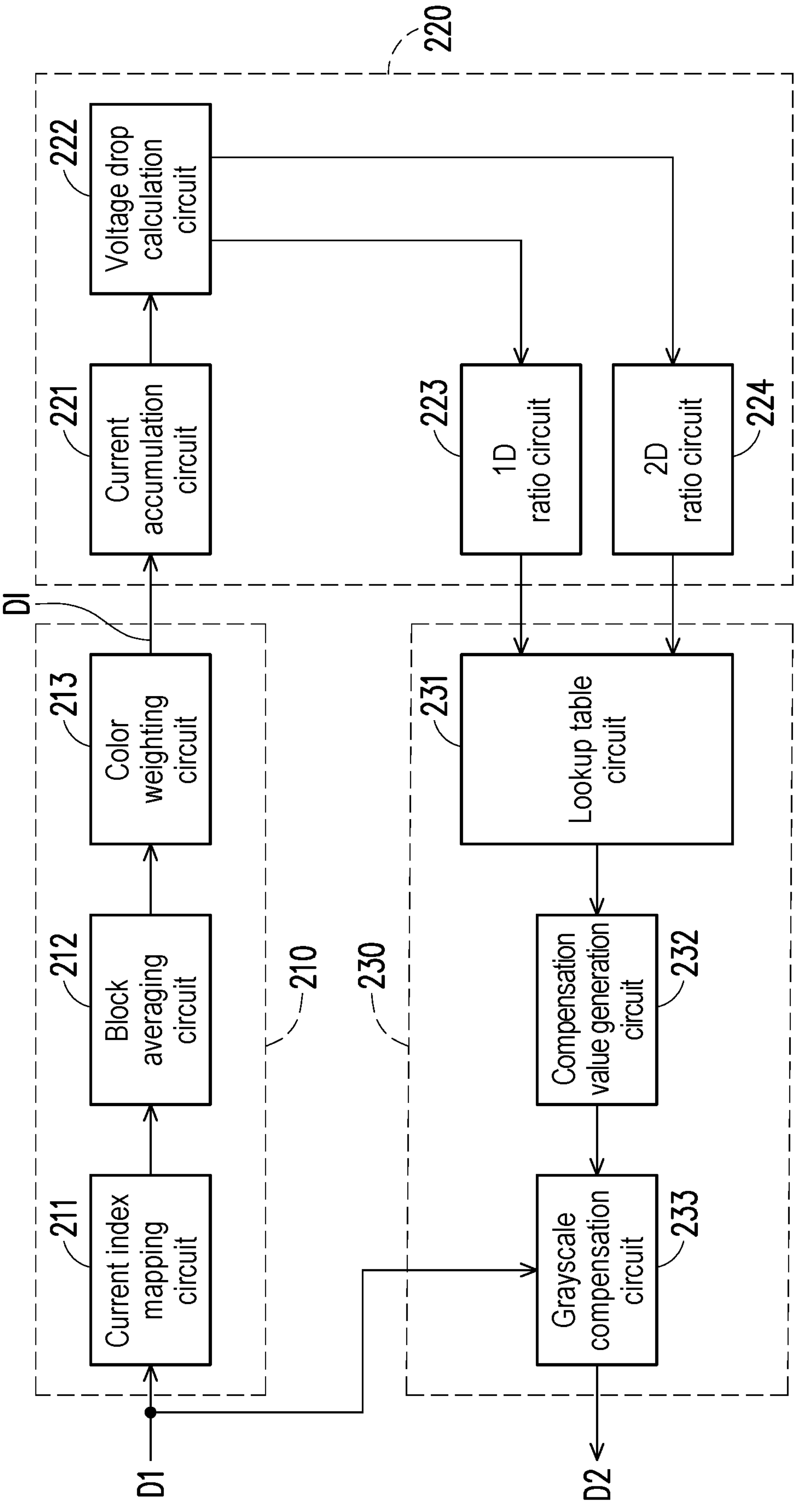
FIG. 8 is a schematic circuit block diagram of a data conversion circuit, a voltage drop estimation circuit, and a compensation circuit shown according to an embodiment of the invention.

FIG. 8 is a schematic circuit block diagram of the data conversion circuit 210, the voltage drop estimation circuit 220, and the compensation circuit 230 shown according to an embodiment of the invention. The data conversion circuit 210, the voltage drop estimation circuit 220, and the compensation circuit 230 shown in FIG. 8 may be taken as one of many implementation examples of the data conversion circuit 210, the voltage drop estimation circuit 220, and the compensation circuit 230 shown in FIG. 2. Reference may be made to the relevant descriptions of the data conversion circuit 210, the voltage drop estimation circuit 220, and the compensation circuit 230 shown in FIG. 2 for the data conversion circuit 210, the voltage drop estimation circuit 220, and the compensation circuit 230 shown in FIG. 8, which are thus not repeated herein.

In the embodiment shown in FIG. 8, the data conversion circuit 210 includes a current index mapping circuit 211, a block averaging circuit 212, and a color weighting circuit 213. The current index mapping circuit 211 may convert the original grayscale data D1 of the target pixel block into a plurality of sub-pixel current values corresponding to a plurality of sub-pixels of the target pixel block based on a grayscale-to-current conversion curve. For example (but not limited thereto), the current index mapping circuit 211 may convert the original grayscale data D1 of the target pixel block into a plurality of sub-pixel current values corresponding to a plurality of sub-pixels of the target pixel block based on the grayscale-to-current conversion curve shown in FIG. 4, the grayscale-to-current conversion curve shown in FIG. 5, or other conversion curves.

The block averaging circuit 212 is coupled to the current index mapping circuit 211 to receive the sub-pixel current values. The block averaging circuit 212 may perform averaging calculation on the sub-pixel current values of the target pixel block according to color to generate a plurality of color current average values of the target pixel block. It is assumed that the target pixel block includes a plurality of red sub-pixels, a plurality of green sub-pixels, and a plurality of blue sub-pixels. The block averaging circuit 212 may average red sub-pixel current values to generate a red current average value R. The block averaging circuit 212 may average green sub-pixel current values to generate a green current average value G. The block averaging circuit 212 may average blue sub-pixel current values to generate a blue current average value B.

The color weighting circuit 213 is coupled to the block averaging circuit 212 to receive the color current average values. The color weighting circuit 213 may perform weighting calculation on the color current average values of the target pixel block to generate the current data DI of the target pixel block. For example (but not limited thereto), the data conversion circuit 210 may calculate Formula (2) to generate the current data DI of the target pixel block.

In the embodiment shown in FIG. 8, the voltage drop estimation circuit 220 includes a current accumulation circuit 221, a voltage drop calculation (IR drop calculation) circuit 222, a 1D ratio circuit 223, and a 2D ratio circuit 224. The current accumulation circuit 221 is coupled to the data conversion circuit 210 to receive the current data DI of each of the pixel blocks of the display panel. The current accumulation circuit 221 may accumulate the current data of different pixel blocks in the same pixel block column along the reverse transmission direction of the data line of the display panel to learn the current accumulation value corresponding to each of the pixel blocks in the same pixel block column. For example (but not limited thereto), with reference to the relevant description of FIG. 6, the current accumulation circuit 221 may accumulate the current data of different pixel blocks in the same pixel block column to learn the current accumulation value corresponding to each of the pixel blocks in the same pixel block column.

In addition, the current accumulation circuit 221 may sum up the current data of all of the pixel blocks in any pixel block column to learn the column current data of each of the pixel block columns. The current accumulation circuit 221 may accumulate the column current data of different pixel block columns along the reverse transmission direction of the source driver power line to learn a column current accumulation value corresponding to each of the pixel block columns. For example (but not limited thereto), with reference to the relevant description of FIG. 7, the current accumulation circuit 221 may accumulate the current data (the column current data) of different pixel block columns to learn the current accumulation value (the column current accumulation value) corresponding to each of the pixel block columns.

The voltage drop calculation circuit 222 is coupled to the current accumulation circuit 221 to receive the current accumulation value and the column current accumulation value. The voltage drop calculation circuit 222 may count the current accumulation values of different pixel blocks in the same pixel block column along the transmission direction of the data line to learn a column voltage drop characteristic value (a column IR drop characteristic value) corresponding to each of the pixel blocks in the same pixel block column. For example (but not limited thereto), with reference to the relevant description of FIG. 6, the voltage drop calculation circuit 222 may count the current accumulation values (the column current accumulation values) of different pixel blocks in the same pixel block column to learn the voltage drop characteristic value (the column voltage drop characteristic value) corresponding to each of the pixel blocks in the same pixel block column.

In addition, the voltage drop calculation circuit 222 may count the column current accumulation values of different pixel block columns along the transmission direction of the source driver power line to learn a row voltage drop characteristic value (a row IR drop characteristic value) corresponding to each of the pixel block columns. For example (but not limited thereto), with reference to the relevant description of FIG. 7, the voltage drop calculation circuit 222 may count the current accumulation values (the column current accumulation values) of different pixel block columns to learn the voltage drop characteristic value (the row voltage drop characteristic value) corresponding to each of the pixel block columns.

The 1D ratio circuit 223 is coupled to the voltage drop calculation circuit 222 to receive the column voltage drop characteristic value. The 1D ratio circuit 223 may calculate a 1D voltage drop ratio corresponding to the target pixel block using the column voltage drop characteristic value of the target pixel block and a reference column voltage drop characteristic value of the target pixel block. For example, assuming that the column voltage drop characteristic value of the target pixel block is IRD68 and the reference column voltage drop characteristic value of the target pixel block is IRDM68, the 1D voltage drop ratio (the transmission line voltage drop information) of the target pixel block is R1D68=IRD68/IRDM68.

The 2D ratio circuit 224 is coupled to the voltage drop calculation circuit 222 to receive the row voltage drop characteristic value. The 2D ratio circuit 224 may calculate a 2D voltage drop ratio corresponding to the target pixel block using the row voltage drop characteristic value of a target pixel block column corresponding to the target pixel block and a reference row voltage drop characteristic value of the target pixel block column. For example, assuming that the row voltage drop characteristic value of the target pixel block column corresponding to the target pixel block is IRD78 and the reference row voltage drop characteristic value of the target pixel block column is IRDM78, the 2D voltage drop ratio (the transmission line voltage drop information) of the target pixel block is R2D78=IRD78/IRDM78.

In the embodiment shown in FIG. 8, the compensation circuit 230 includes a lookup table circuit 231, a compensation value generation circuit 232, and a grayscale compensation circuit 233. The lookup table circuit 231 is coupled to the voltage drop estimation circuit to receive the transmission line voltage drop information. Here, the transmission line voltage drop information of the target pixel block may include the 1D voltage drop ratio and the 2D voltage drop ratio. The lookup table circuit 231 may obtain at least one first compensation value corresponding to the target pixel block from at least one lookup table based on the position of the target pixel block. The lookup table circuit 231 may calculate a second compensation value of the target pixel block using the first compensation value and the transmission line voltage drop information of the target pixel block.

For example (but not limited thereto), the at least one lookup table may include a maximum loading condition lookup table and a minimum loading condition lookup table. The lookup table circuit 231 may obtain the maximum loading condition compensation value corresponding to the target pixel block from the maximum loading condition lookup table and obtain the minimum loading condition compensation value corresponding to the target pixel block from the minimum loading condition lookup table based on the position of the target pixel block in the display panel. Using the maximum loading condition compensation value and the minimum loading condition compensation value (the first compensation value) and using the 1D voltage drop ratio and the 2D voltage drop ratio (the transmission line voltage drop information) of the target pixel block, the lookup table circuit 231 may calculate the second compensation value of the target pixel block. For example, the lookup table circuit 231 may calculate Formula (3) to generate the second compensation value of the target pixel block.

The compensation value generation circuit 232 is coupled to the lookup table circuit 231 to receive the second compensation value. The compensation value generation circuit 232 may convert the second compensation value of the target pixel block into at least one pixel compensation value of the target pixel block (e.g., the sub-pixel compensation values corresponding to a plurality of edge sub-pixels of the target pixel block). For example, the compensation value generation circuit 232 may perform interpolation/extrapolation using the second compensation value of the target pixel block and the second compensation value of an adjacent pixel block adjacent to the target pixel block to calculate the second compensation values of the edge sub-pixels (e.g., the second compensation values of sub-pixels at four corners) of the target pixel block. Then, the compensation value generation circuit 232 may perform interpolation/extrapolation using the second compensation values (the sub-pixel compensation values) of the edge sub-pixels to calculate the sub-pixel compensation value corresponding to each of the other sub-pixels in the target pixel block.

The grayscale compensation circuit 233 is coupled to the compensation value generation circuit 232 to receive the pixel compensation value. The grayscale compensation circuit 233 may compensate the original grayscale data of the target pixel block using the pixel compensation value, so as to generate compensated grayscale data D2 of the target pixel block.

Figure 9:
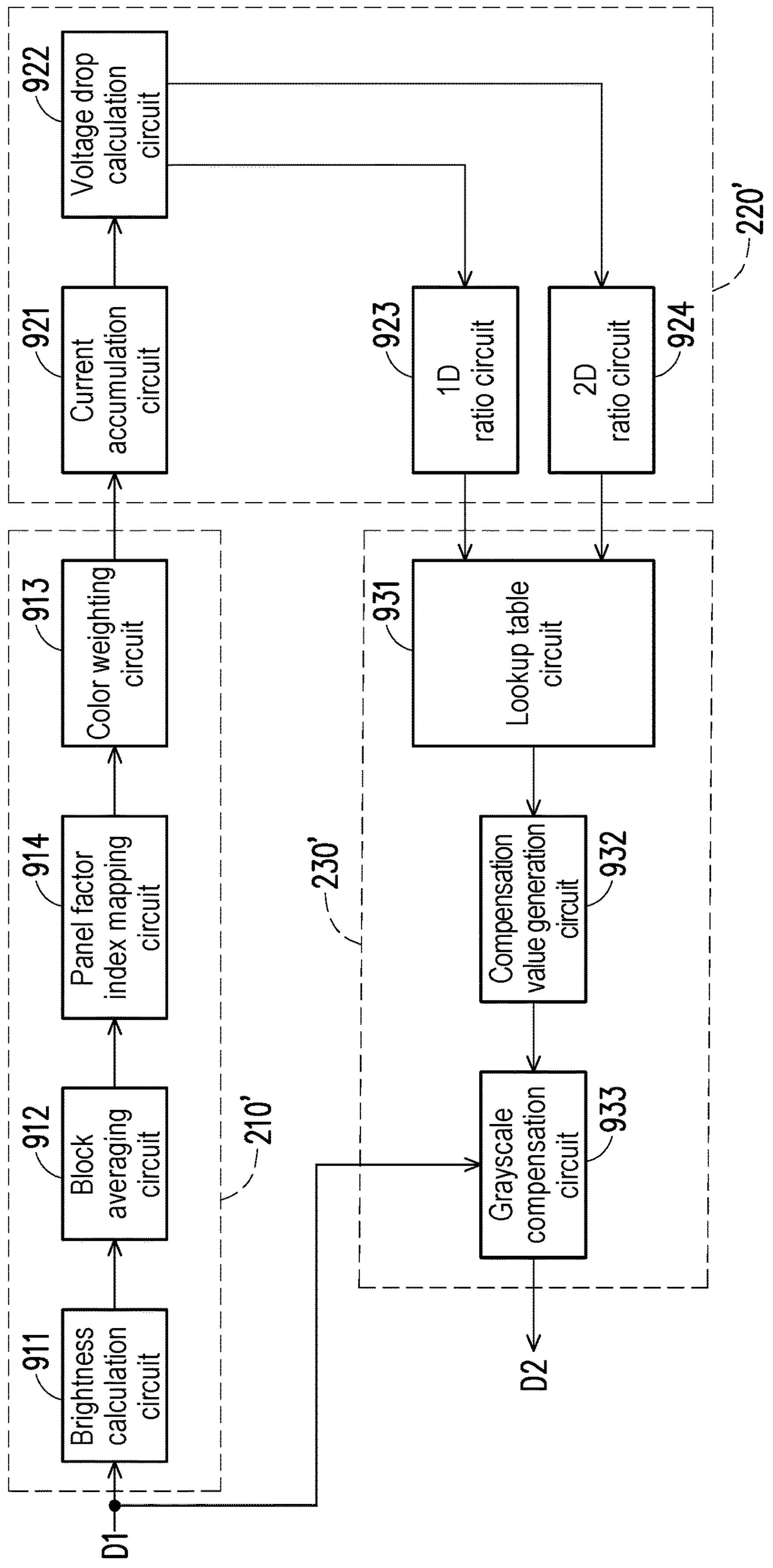
FIG. 9 is a schematic circuit block diagram of a data conversion circuit, a voltage drop estimation circuit, and a compensation circuit shown according to the second embodiment of the invention.

FIG. 9 is a schematic circuit block diagram of a data conversion circuit 210', a voltage drop estimation circuit 220', and a compensation circuit 230' shown according to the second embodiment of the invention. The data conversion circuit 210', the voltage drop estimation circuit 220', and the compensation circuit 230' shown in FIG. 9 may be taken as another configuration of many implementation examples of the data conversion circuit 210, the voltage drop estimation circuit 220, and the compensation circuit 230 shown in FIG. 2. Reference may be made to the relevant descriptions of the data conversion circuit 210, the voltage drop estimation circuit 220, and the compensation circuit 230 shown in FIG. 2 for the data conversion circuit 210', the voltage drop estimation circuit 220', and the compensation circuit 230' shown in FIG. 9.

The main difference between FIG. 9 and FIG. 8 is that the operations of the detailed circuits in the data conversion circuit 210' and the voltage drop estimation circuit 220' shown in FIG. 9 are slightly different from those of FIG. 8. Specifically, a brightness calculation circuit 911 and a panel factor index mapping circuit 914 are added to the data conversion circuit 210' of FIG. 9, and the detailed processes of the voltage drop calculation circuit 922, the 1D ratio circuit 923, and the 2D ratio circuit 924 in the voltage drop estimation circuit 220' of FIG. 9 are described in detail.

In the present embodiment, in addition to the above functions, the data conversion circuit 210' of FIG. 9 may also light up the panel in the display device according to test patterns W and divide the panel into a plurality of regions (for example, each of the pixel blocks), and based on various test patterns W, the brightness of each of the regions (each of the pixel blocks) on the panel is measured to analyze and store the boundary grayscale value of each of the regions (each of the pixel blocks). The measured brightness of each of the regions (each of the pixel blocks) is compared to the target brightness value and converted to find the boundary grayscale value. Moreover, the load on the transmission line coupled to the source driver is varied depending on the content of the current data. Therefore, for the load of the source driver on the transmission line, the brightness measured in each of the regions (each of the pixel blocks) and the boundary grayscale value may be calculated under different loads, and a brightness and boundary grayscale value lookup table is established for the situations to achieve maximum test coverage for the panel. The detailed steps and processes of each of the elements in FIG. 9 are described below.

The brightness calculation circuit 911 and the block averaging circuit 912 in the data conversion circuit 210' of FIG. 9 generate a plurality of color current average values according to the original grayscale data of the target pixel block. Specifically, the brightness calculation circuit 911 in the data conversion circuit 210' of FIG. 9 calculates the parameters needed for setting brightness conversion in the display device based on each of the pixels to facilitate subsequent grayscale data conversion. Gamma curves or other conversion curves are mainly measured and established for the pixel brightness in the center point region of the panel. However, there is no special consideration for other regions in the panel that are not the center point region, but these other regions may be affected by the above voltage drop phenomenon. Therefore, if only the gamma curve is used to compensate pixel data, except that the pixel brightness in the center point region is compensated and approaches the target brightness value, other regions may be affected by the voltage drop phenomenon, resulting in uneven pixel brightness. For example, affected by the voltage drop phenomenon, a pixel block farther away from the source driver has less brightness due to the larger impedance of the transmission line thereof; the closer the pixel block is to the source driver, the brighter the pixel block is due to the smaller impedance of the transmission line thereof.

In an embodiment of the invention, the brightness calculation circuit 911 of FIG. 9 establishes the brightness and boundary grayscale value lookup table via the ratio of the measured brightness data to the target brightness value. Specifically, the brightness calculation circuit 911 of FIG. 9 converts the grayscale data of each of the pixels into current according to the dimming status of each of the regions on the panel, so that the presentation mode of each of the pixels is converted from the grayscale domain (that is, each of the pixels is presented based on grayscale data) to the brightness domain (that is, each of the pixels is presented based on brightness). In other words, the brightness calculation circuit 911 of the data conversion circuit 210' of FIG. 9 converts the original grayscale data D1 of the target pixel block into a plurality of subpixel current values corresponding to a plurality of subpixels of the target pixel block based on the grayscale-to-current conversion curve.

Figure 11:
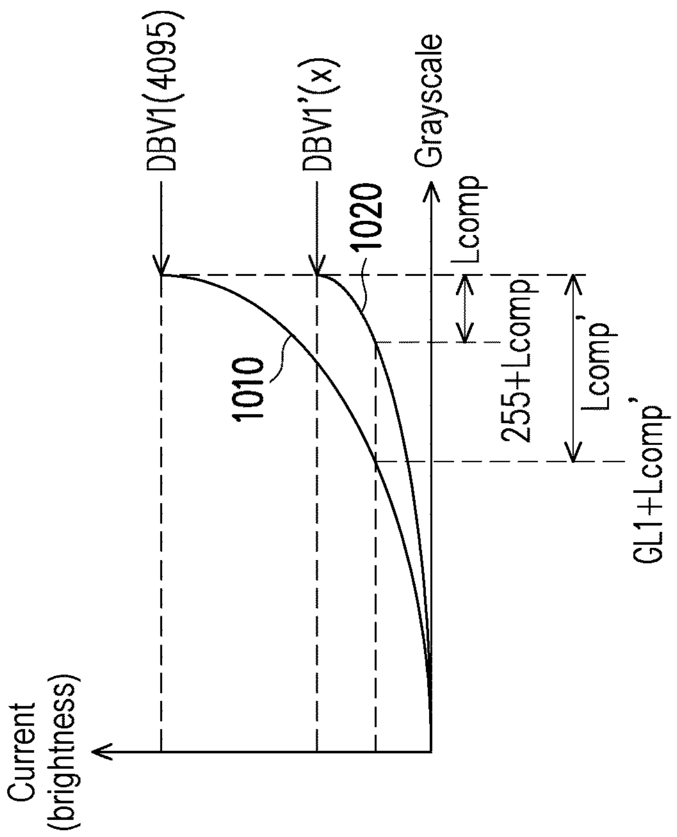
FIG. 10 and FIG. 11 are schematic diagrams of adjusting the grayscale-to-current conversion curve for each of the pixels according to the second embodiment of the invention.
Figure 10:
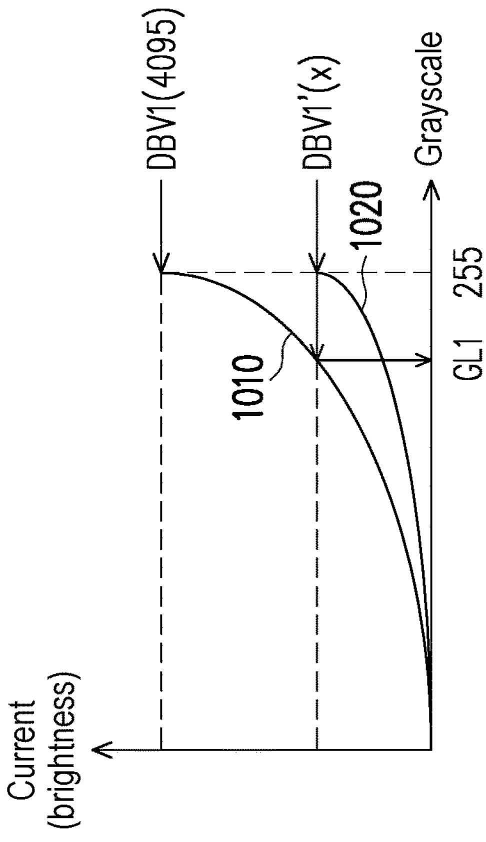

FIG. 10 and FIG. 11 are schematic diagrams of adjusting the grayscale-to-current conversion curve for each of the pixels according to the second embodiment of the invention. FIG. 10 shows an original grayscale-to-current conversion curve 1010 of a target pixel on a panel and a grayscale-to-current conversion curve 1020 adjusted according to brightness ratio. The grayscale-to-current conversion curve 1020 is generated by multiplying the grayscale-to-current conversion curve 1010 with the brightness ratio between an upper boundary current value DBV1 of the conversion curve (here, the current value "4095" is used as an example) and an upper boundary current value DBV1' measured in the target region (target pixel block) (here, the current value "x" is used as an example). The upper boundary current value DBV1 ("4095") of the conversion curve may be compared with the brightness current value obtained by measuring the pixel brightness in the center point region of the panel when the test pattern is the maximum grayscale value (for example, "255"). The upper boundary current value DBV1' ("x") is the upper boundary current value measured from the target region (target pixel block) when the test pattern is the maximum grayscale value (for example, "255"). Referring to FIG. 10, the upper boundary current value DBV1' ("x") corresponds to a grayscale parameter GL1 according to the grayscale-to-current conversion curve 1010.

Referring to FIG. 11, in the present embodiment, the brightness parameters of each grayscale data and each pixel are calculated according to the grayscale-to-current conversion curves 1010 and 1020 as parameters needed for brightness conversion. For example, the grayscale data ("255+Lcomp" in FIG. 11) after the grayscale maximum value ("255") is added with the grayscale compensation value Lcomp corresponds to the grayscale data ("GL1+Lcomp'" in FIG. 11) after the grayscale parameter GL1 is added with the grayscale compensation value Lcomp'. In other words, the brightness calculation circuit 911 of FIG. 9 may implement the search of the original grayscale data D1 of the target pixel to convert the grayscale value (for example, FIG. 11 "255+Lcomp") into the compensated grayscale value (for example, FIG. 11 "GL1+Lcomp'") for the overall brightness (such as searching via a lookup table), and the search for brightness compensation under different brightness settings (such as searching via a lookup table) according to FIG. 10 and FIG. 11

The block averaging circuit 912 of FIG. 9 divides the original grayscale data D1 into partitions according to the pixel blocks on the panel, and performs averaging calculation on the sub-pixel current values of the target pixel block according to color classification to generate a plurality of color current average values of the target pixel block. The block averaging circuit 912 of FIG. 9 divides the original grayscale data D1 as the input image into a plurality of blocks (for example, a plurality of pixel blocks) and averages the pixel current (brightness) in each of the blocks (pixel blocks) to obtain the current average value for different colors (such as red, green, blue) in each block (pixel block), or obtains the brightness current value of each of the pixels in pixel units. If the block averaging circuit 912 of FIG. 9 obtains the brightness current value of each of the pixels in pixel units and performs subsequent processing, optimal visual effect may be obtained. In the present embodiment, the type of optimized distinguishing region (pixel block) may be found according to panel characteristics or panel status. For example, if the hardware in the panel (e.g., pixel blocks and source drivers) may support the technique of optimizing differentiated regions (pixel blocks), four pixel blocks with a length and width of 2×2 may be dynamically integrated into a 4×4 pixel block, and the 4×4 pixel block may be processed together in the subsequent processing of the present embodiment. Alternatively, a 4×4 pixel block is split into 4 pixel blocks with a length and width of 2×2, and each of the four 2×2 pixel blocks is subjected to subsequent processing of the present embodiment. In the present embodiment, whether or not to divide the original grayscale data D1 into a plurality of blocks (e.g., a plurality of pixel blocks) may be switched via settings to calculate subsequent brightness compensation, or to calculate subsequent brightness compensation in pixel units. In addition, the number of the original grayscale data D1 divided into a plurality of regions (pixel blocks) may also be adjusted via settings to analyze the average current value of each region.

For convenience of explanation, the present embodiment further describes the subsequent embodiment of FIG. 9 in the form of regions (pixel blocks). The block averaging circuit 912 of FIG. 9 divides the original grayscale data D1 into a plurality of pixel blocks of 4×3 to perform brightness compensation analysis.

Figure 12:
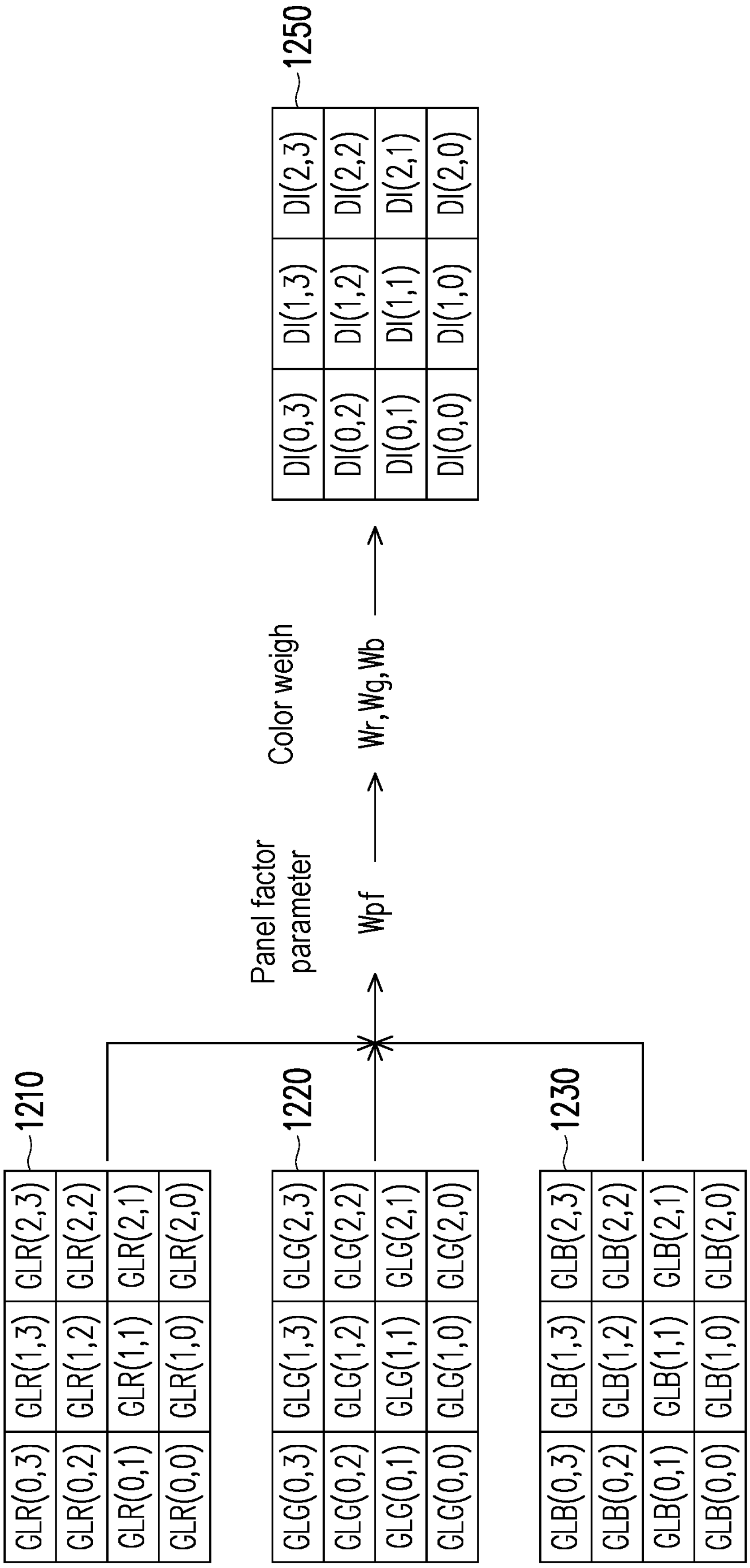
FIG. 12 is a schematic diagram corresponding to a block averaging circuit, a panel factor index mapping circuit, and a color weighting circuit according to the second embodiment of the invention.

FIG. 12 is a schematic diagram corresponding to the block averaging circuit 912, the panel factor index mapping circuit 914, and the color weighting circuit 913 according to the second embodiment of the invention. Referring to FIG. 12, the block averaging circuit 912 of FIG. 9 generates a different current average value for each color. For example, assuming that the target pixel block includes a plurality of red sub-pixels, a plurality of green sub-pixels, and a plurality of blue sub-pixels, the block averaging circuit 912 of FIG. 9 generates red current average values GLR(0, 0) to GLR(2, 3) of each region (e.g., pixel blocks (0, 0) to (2, 3)) (labeled 1210 in FIG. 9), green current average values GLG(0, 0) to GLG(2, 3) (labeled 1220 in FIG. 9), and blue current average values GLB(0, 0) to GLB(2, 3) (labeled 1230 in FIG. 9).

The panel factor index circuit 914 of FIG. 9 calculates a plurality of color current average values of the target pixel block according to the panel factor parameter to generate a plurality of adjusted color current average values of the target pixel block. Specifically, since each manufacturer's panel is sensitive to factors such as scanning pulse signal, temperature, signal frequency, where the panel driver is placed on the panel, etc., all of which may cause voltage drop phenomenon or defects related to pixel brightness, the panel factor index circuit 914 of FIG. 9 generates a panel factor parameter based on grayscale conversion current of each panel and each color according to the comprehensive consideration of factors such as the corresponding data, scanning pulse signal, ambient temperature where the pixel circuit is located, and signal frequency of each manufacturer's panel. The panel factor parameter is related to an ambient temperature of the target pixel block located on a display panel of the display device, a scanning pulse signal or a signal frequency received by the target pixel block, or a combination of the above.

Figure 13:
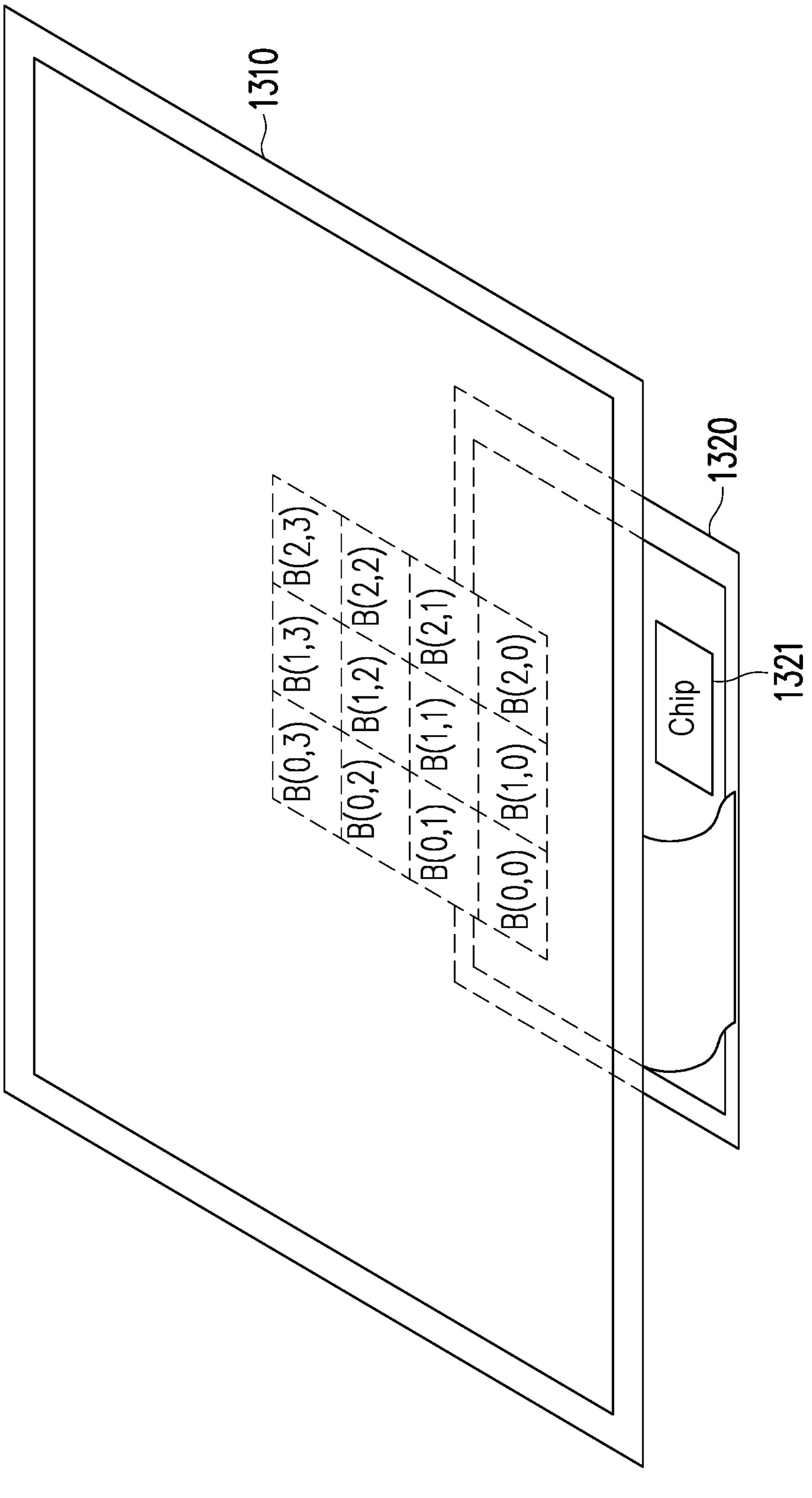
FIG. 13 is a schematic diagram of the positions of a panel and a panel driver backplane according to the second embodiment of the invention.

FIG. 13 is a schematic diagram of the positions of the panel 1310 and the panel driver backplane 1320 according to the second embodiment of the invention. Here, FIG. 13 is used as an example to illustrate that the position of the panel driver backplane 1320 relative to the panel 1310 may affect the temperature of the pixel blocks B(0, 0) to B(2, 3) on the panel 1310. The panel driver backplane 1320 may be folded and attached to the bottom of the panel 1310. Since the panel driver backplane 1320 is provided with a chip 1321, the heat generated when the chip 1321 is operated is directed to some pixel blocks of the panel 1310.

For example, in FIG. 13, the pixel blocks B(0, 0), B(1, 0), and B(2, 0) are located directly above the panel driver backplane 1320. The pixel blocks B(0, 1), B(1, 1), B(2, 1) are adjacent to the panel driver backplane 1320. The pixel blocks are likely to be affected by the high temperature from the operation of the chip 1321, causing the luminescence of the pixel elements in the pixel circuit (e.g., OLED pixel circuit) on the panel 1310 to decline or the load on the transmission line to increase due to high heat. Therefore, in the present embodiment, the panel factor parameter is correspondingly adjusted and generated according to each manufacturer's panel characteristics, the relative position of the panel to the panel driver backplane 1320, the ambient temperature of the target pixel block on the display panel, scanning pulse signal and signal frequency received by the target pixel block, or other factors, and the panel factor parameter is multiplied with the current average values for compensation. The panel factor parameter may be an integrated panel factor parameter Wpf, or may be red, green, and blue panel factor parameters adjusted according to different colors, and may be adjusted according to the needs of those applying the present embodiment.

Those who apply the present embodiment may set temperature sensors or sensors of corresponding parameters on pixel blocks everywhere on the panel and generate the panel factor parameter Wpf in advance based on the sensor feedback when designing a display device. At this time, the panel factor parameter Wpf is a preset value and is not readily changed. Moreover, those who apply the present embodiment may also set a temperature sensor or a sensor of corresponding parameters at the positions of some pixel blocks on the display device and adaptively adjust the panel factor parameter Wpf according to the feedback of the sensor during the actual operation of the panel, so that the panel factor parameter Wpf may be dynamically adjusted according to the environment.

Moreover, referring to FIG. 9 and FIG. 12, the color weighting circuit 913 of FIG. 9 has a weight corresponding to each color to compensate for the current ratio according to the color compensation technique provided by each panel manufacturer, and may be, for example, the red weight Wr, the green weight Wg, and the blue weight Wb described in the previous embodiments. The red weight Wr, the green weight Wg, and the blue weight Wb of the present embodiment may be provided by various panel manufacturers.

For example (but not limited to this), the data conversion circuit 210' of FIG. 9 may obtain the compensated current average value DI of each corresponding pixel block (marked 1250 in FIG. 12) by calculating the following Formula (4). (u, v) represents the position of the pixel block. For example, u is 0 and v is 3 in the pixel block B(0, 3). Wpf is the panel factor parameter, and GLR(u, v), GLG(u, v), and GLB(u, v) are the red current average value, the green current average value, and the blue current average value of the corresponding pixel block respectively. M represents the maximum grayscale (such as 255 or other real numbers).

$$DI(u,v)=Wpf*[Wr(u,v)*GLR(u,v)+Wg(u,v)*GLG(u,v)+Wb(u,v)*GLB(u,v)]/M \quad \text{Formula (4)}$$

Returning to FIG. 9, the voltage drop estimation circuit 220' of FIG. 9 is coupled to the data conversion circuit 210 to receive the current data DI of the target pixel block. The voltage drop estimation circuit 220' of FIG. 9 converts the current data DI into transmission line voltage drop information of the target pixel block. The voltage drop phenomenon is caused by factors such as the impedance of the source driver power line, the location of the source driver, the impedance in the transmission line driven by the source driver, etc. Based on the above embodiments and the corresponding description of FIG. 6, the voltage drop estimation circuit 220 of FIG. 1 is coupled to the data conversion circuit 210 to receive the current data of each of the pixel blocks of the transmission line. The voltage drop estimation circuit 220 of FIG. 1 accumulates the current data of the pixel blocks of the transmission line along the reverse transmission direction of the transmission line to learn the accumulated current value corresponding to each of the pixel blocks. The voltage drop estimation circuit 220 of FIG. 1 calculates a voltage drop ratio using the voltage drop characteristic value of the target pixel block and a reference voltage drop characteristic value of the target pixel block. Moreover, when the transmission line is a data line, when the plurality of pixel groups corresponding to the transmission lines are different pixel blocks in the same column of the display panel (for example, the pixel blocks 611 to 618 shown in FIG. 6), it is assumed that the maximum voltage drop characteristic values of the pixel blocks 611 to 618 shown in FIG. 6 are IRDM61, IRDM62, IRDM63, IRDM64, IRDM65, IRDM66, IRDM67, and IRDM68 respectively. Therefore, the 1D voltage drop ratio (transmission line voltage drop information) of the pixel block 611 is R1D61=IRD61/IRDM61. By analogy, the 1D voltage drop ratio (the transmission line voltage drop information) of the pixel block 618 is R1D68=IRD68/IRDM68. In other words, the voltage drop estimation circuit 220 of FIG. 1 has the same function as the voltage drop estimation circuit 220' of FIG. 9. The current accumulation circuit 921 of FIG. 9 accumulates the current flowing through the transmission line corresponding to each of the pixel blocks, and the voltage drop calculation circuit 922 of FIG. 9 calculates the load characteristic value of the transmission line corresponding to each of the pixel blocks according to the accumulated current.

Figure 14:
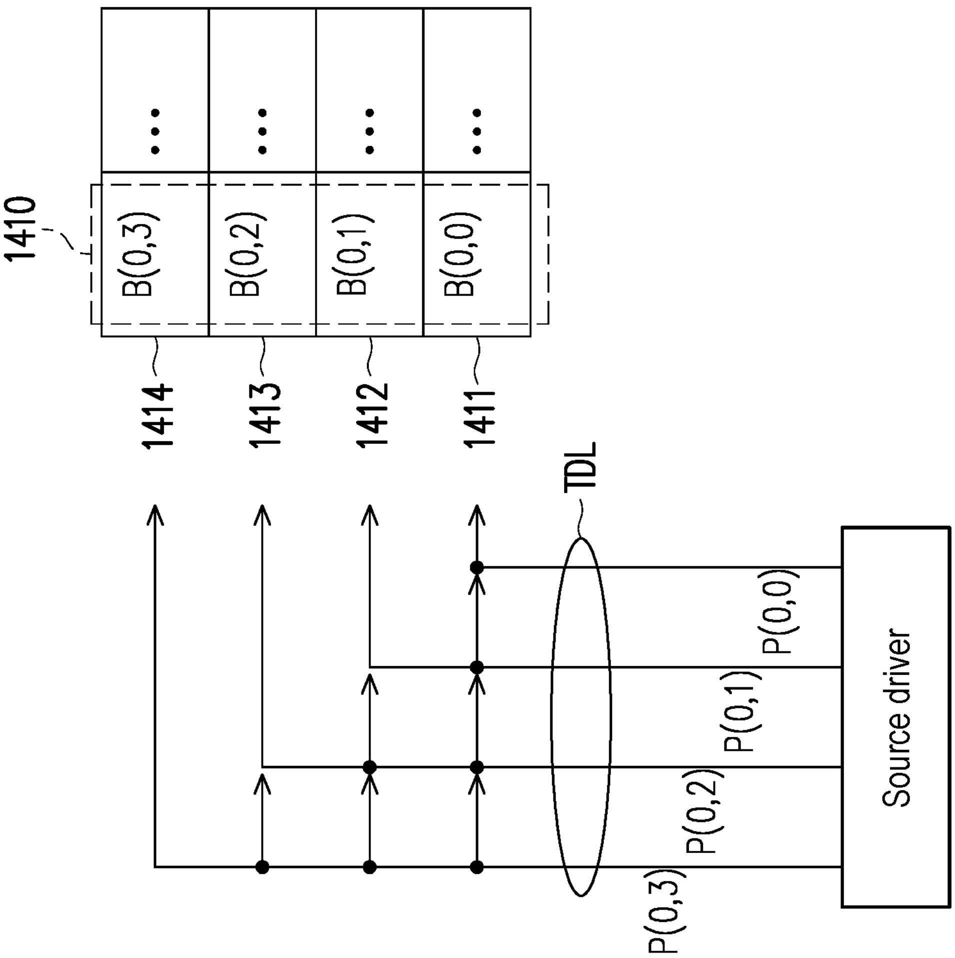
FIG. 14 is a schematic diagram of a pixel block column and a source driver located in a 1D direction according to the second embodiment of the invention.

For convenience of explanation, in the present embodiment, the principle of current accumulation and the dynamic calculation of the load in the transmission line are illustrated using a pixel block column 1410 including pixel blocks 1411 to 1414 in FIG. 14. FIG. 14 is a schematic diagram of the pixel block column 1410 and a source driver located in a 1D direction according to the second embodiment of the invention. The pixel blocks 1411 to 1414 correspond to current data DI(0, 3) to DI(0, 0) respectively. It is assumed that each of the pixel block columns (e.g., the pixel block column 1410) transmits the current data DI(0, 3) to DI(0, 0) to each of the pixel blocks 1411 to 1414 in the pixel block columns 1410 via one transmission line TDL (e.g., data line) via a single source driver. For convenience of explanation, the transmission line TDL of the present embodiment may have four transmission line paths P(0, 0) to P(0, 3). The transmission line paths P(0, 0) to P(0, 3) are all transmitted on a single transmission line TDL. The transmission line path P(0, 0) carries the current data DI(0, 0) so that the source driver transmits the current data DI(0, 0) to the pixel block 1411; the transmission line path P(0, 1) carries the current data DI(0, 0) and DI(0, 1) so that the source driver transmits the current data DI(0, 0) and DI(0, 1) to the pixel blocks 1411 and 1412 respectively; the transmission line path P(0, 2) carries the current data DI(0, 0), DI(0, 1), and DI(0, 2) so that the source driver transmits the current data DI(0, 0), DI(0, 1), and DI(0, 3) to the pixel blocks 1411, 1412, and 1413 respectively; the transmission line path P(0, 3) carries the current data DI(0, 0), DI(0, 1), DI(0, 2), and DI(0, 3) so that the source driver transmits the current data DI(0, 0), DI(0, 1), DI(0, 2), and DI(0, 3) to the pixel blocks 1411, 1412, 1413, and 1414 respectively. In other words, the principle of driving the pixel unit is that the source driver flows from the bottom end of the panel (e.g., the pixel block 1411) to the far end of the panel (e.g., the pixel block 1414) via a single transmission line TDL. Therefore, the current data carried on the transmission line path P(0, 3) needs to be accumulated from the current data DI(0, 3) of the far-end pixel block 1414 all the way to the current data DI(0, 0) of the bottom pixel block 1411.

In particular, although the current data DI(0, 3) to DI(0, 0) corresponding to the pixel blocks 1411 to 1414 are fixed values, since the subsequent compensation values for the transmission line paths P(0, 1) to P(0, 3) in the present embodiment may change the corresponding current data provided to the pixel blocks 1411 to 1414, in the present embodiment, the current accumulation values carried by the transmission line paths P(0, 0), P(0, 1), P(0, 2), and P(0, 3) are respectively expressed as current accumulation values Iacc(0, 0), Iacc(0, 1), Iacc(0, 2), and Iacc(0, 3). The current accumulation values are all current data of a plurality of pixel blocks coupled on the transmission line accumulated along the reverse transmission direction of the transmission line to facilitate subsequent explanation. In the initial stage, the current accumulation value Iacc(0, 0) is equal to the current data DI(0, 0); the current accumulation value Iacc(0, 1) is equal to the sum of the current data DI(0, 0) and DI(0, 1); the current accumulation value Iacc(0, 2) is equal to the sum of the current data DI(0, 0), DI(0, 1), and DI(0, 2); the current accumulation value Iacc(0, 3) is equal to the sum of the current data DI(0, 0), DI(0, 1), DI(0, 2), and DI(0, 3).

The load characteristic values of the transmission line paths P(0, 0), P(0, 1), P(0, 2), and P(0, 3) are respectively expressed as load characteristic values L(0, 0), L(0, 1), L(0, 2), and L(0, 3). In detail, the load characteristic value L(0, 0) is proportional to and directly related to the current accumulation value Iacc(0, 0), as shown in Formula (5).

$$L(0,0) \propto Iacc(0,0) \qquad \text{Formula (5)}$$

The load characteristic value L(0, 1) is related to the current accumulation values Iacc(0, 0) and Iacc(0, 1), the load characteristic value L(0, 0), and the compensation value comp0, as shown in Formula (6).

$$L(0,1) = \sum_{n=0}^{1} Iacc(0,n) \times \frac{L(0,0)}{L(0,0) + comp0} \qquad \text{Formula (6)}$$

The load characteristic value L(0, 2) is related to the current accumulation values Iacc(0, 0) to Iacc(0, 2), the load characteristic values L(0, 0) to L(0, 1), and the compensation value comp1, as shown in Formula (7).

$$L(0,2) \propto \sum_{n=0}^{2} Iacc(0,n) \times \frac{L(0,1)}{L(0,1) + comp1} \qquad \text{Formula (7)}$$

The load characteristic value L(0, 3) is related to the current accumulation values Iacc(0, 0) to Iacc(0, 3), the load characteristic values L(0, 0) to L(0, 2), and the compensation value comp2, as shown in Formula (8).

$$L(0,3) \propto \sum_{n=0}^{3} Iacc(0,n) \times \frac{L(0,2)}{L(0,2) + comp2} \qquad \text{Formula (8)}$$

The voltage drop calculation circuit 922 of FIG. 9 of the present embodiment may enter the converted load characteristic values L(0, 0) to L(0, 3) into the preset load compensation lookup table to query the appropriate initial compensation values comp0 to comp2, then calculate Formula (5) to Formula (8) again according to the compensation values comp0 to comp2 and the previous load characteristic values. In this way, more accurate load characteristic values may be obtained via a feedback calculation method. The calculation of the current accumulation values Iacc(0, 0) to Iacc(0, 3) and the calculation of the loads L(0, 0) to L(0, 3) may be implemented by the mutual cooperation of the current accumulation circuit 921 and the voltage drop calculation circuit 922 of FIG. 9. Formula (5) to Formula (8) are continuously calculated when the display device is running. As a result, the voltage drop calculation circuit 922 continuously and dynamically calculates the load characteristic values L(0, 0) to L(0, 3) and the corresponding compensation values comp0 to comp2 on each of the pixel blocks 1411 to 1414 on the transmission line. The dynamic calculation load method makes the pixel brightness on the transmission line more uniform.

The load characteristic values L(0, 0) to L(0, 3) analyzed by each of the pixel blocks 1411 to 1414 are used as the influence of the voltage drop phenomenon, the load characteristic values L(0, 0) to L(0, 3) are proportionally converted in each load compensation lookup table to obtain the updated load compensation lookup table, and corresponding compensation values are calculated for each of the pixel blocks 1411 to 1414 respectively. When establishing the compensation values, the maximum compensation value corresponding to the panel at maximum load and the minimum compensation value corresponding to minimum load are obtained. Since they are the maximum compensation value and minimum compensation value corresponding to the maximum load and the minimum load, the compensation values corresponding to the other loads fall between the maximum compensation value and the minimum compensation value. Therefore, the corresponding compensation value for each of the pixel blocks may be calculated by interpolating the current load and the maximum load/minimum load.

FIG. 14 mainly describes the voltage drop phenomenon in the 1D direction (for example, the vertical direction) and the grayscale compensation technique corresponding to the present embodiment. Since the voltage drop phenomenon is also related to the placement positions of the panel, the source driver, and the power circuit, the above embodiments explain the operation and flow of the 1D ratio circuit 223 and the 2D ratio circuit 224 in FIG. 8 when the power circuit 130 is disposed at a side of the panel in the corresponding descriptions of FIG. 1 and FIG. 7. In the present embodiment, FIG. 15 and FIG. 16 are used to illustrate the operation and flow of the 1D ratio circuit 923 and the 2D ratio circuit 924 in FIG. 9 when the source driver and the power circuit are disposed in the middle of the panel.

Figure 15:
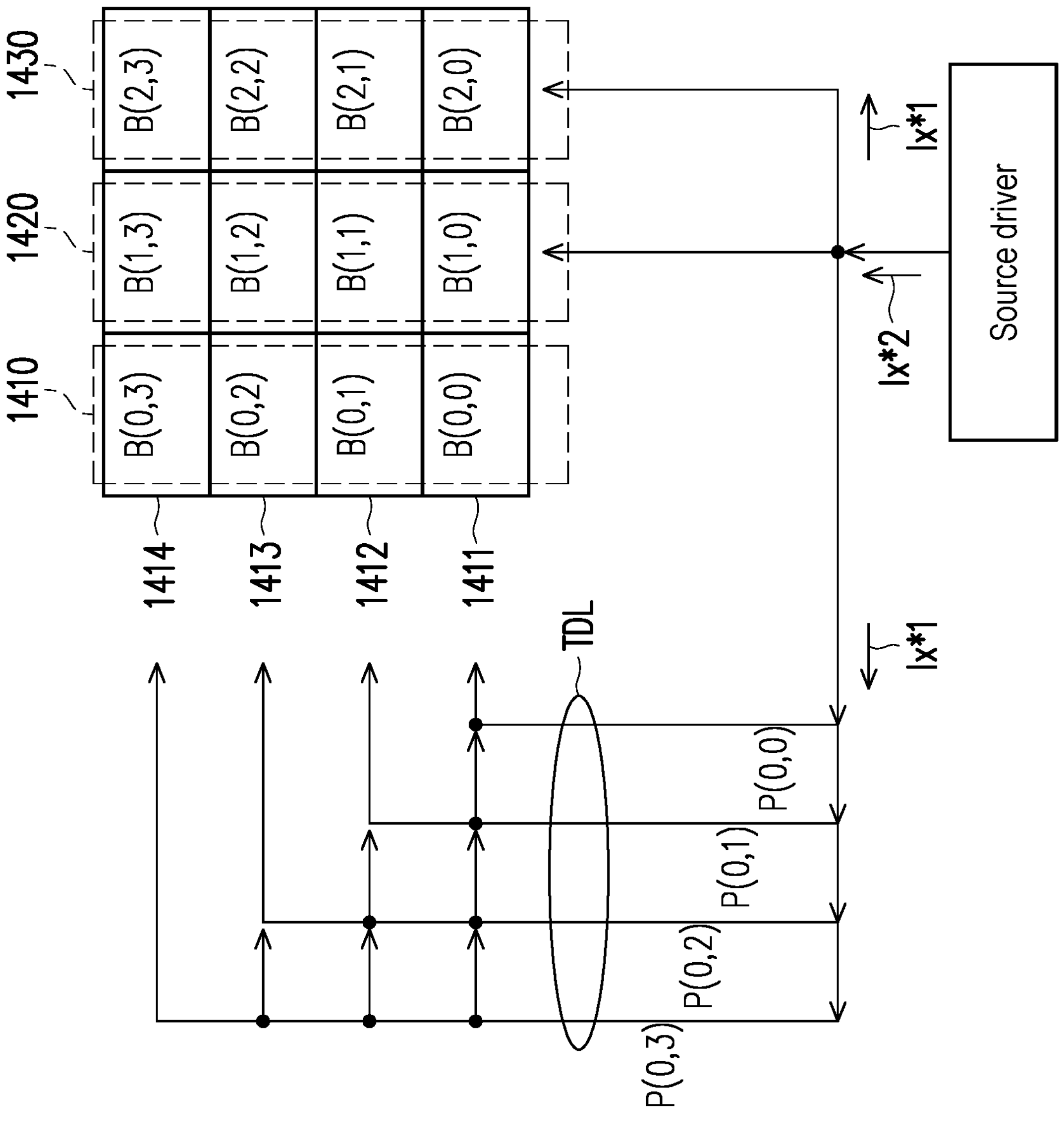
FIG. 15 is a schematic diagram of a plurality of pixel blocks and a source driver on a panel according to the second embodiment of the invention.

FIG. 15 is a schematic diagram of a plurality of pixel blocks and a source driver on a panel according to the second embodiment of the invention. For convenience of explanation, in FIG. 15 of the present embodiment, the panel is divided into 4×3 pixel blocks B(0, 0) to B(2, 3), and the source driver and the corresponding power circuit are disposed at the bottom position of pixel block B(1, 0). In other words, the source driver is disposed at the middle bottom position of the panel.

Referring to FIG. 9 and FIG. 15 at the same time, the content shown at the left side of FIG. 15 is first considered here to describe the voltage drop phenomenon compensation technique in the 1D direction (vertical direction). The 1D ratio circuit 923 in FIG. 9 generates the corresponding column voltage drop characteristic value in the following manner. If the values of each of the current data DI(0, 0) to DI(0, 3) corresponding to each of the pixel blocks B(0, 0) to B(0, 3) 1411 to 1414 of FIG. 15 are similar, they are assumed here to be Iy, and from the perspective of the source driver, a single transmission line TDL carries 1*Iy, 2*Iy, 3*Iy, and 4*Iy corresponding to the transmission line paths P(0, 0), P(0, 1), P(0, 2), and P(0, 3) respectively. Therefore, the load on a single transmission line TDL is proportional to the 1D current accumulation values of 1*Iy, 2*Iy, 3*Iy, and 4*Iy (i.e., 10*Iy).

The lower half in FIG. 15 is considered to describe the voltage drop compensation technique in the 2D direction (horizontal direction). The 2D ratio circuit 924 in FIG. 9 generates the corresponding column voltage drop characteristic value in the following manner. Here, the current delivered by the source driver to the pixel block column 1410 and the pixel block column 1430 is set to Ix*1. Since the currents of the pixel block column 1410 and the pixel block column 1430 are 4*Iy, the current provided to each of the pixel blocks in the pixel block column 1410/pixel block column 1430 is 1*Iy (i.e., Ix*¼). From the perspective of the source driver, the current in the horizontal direction and from the source driver is mainly considered here, so the current provided to the pixel block column 1420 in the 1D direction is ignored. Therefore, in the 2D direction (horizontal direction), the source driver provides a total current of Ix*2. In other words, the load of the source driver in the 2D direction (horizontal direction) is proportional to the 2D current accumulation values of Ix*1 and Ix*2 (i.e., Ix*3). It is particularly important to note that the current accumulation values only calculate the cumulative current from the source driver to the pixel block column 1410 and are not exact current values.

In the present embodiment, according to the proportional relationship of the current Iy (corresponding to the 1D voltage drop ratio corresponding to the target pixel block) and the proportional relationship of the current Ix (corresponding to the 2D voltage drop ratio corresponding to the target pixel block), the final compensation value may be calculated in conjunction with the compensation value corresponding to each of the pixel blocks above.

For example, for the pixel block B(0, 3) of FIG. 15, the 1D voltage drop ratio of the pixel block B(0, 3) is the value after the current on the transmission line path P(0, 3) (4*Iy) is divided by the 1D current accumulation value corresponding to the load on the single transmission line TDL(10*Iy). That is, the 1D voltage drop ratio of the pixel block B(0, 3) is 4/10 (2/5). The 2D voltage drop ratio of the pixel block B(0, 3) is the value after the current delivered by the source driver to a single pixel block in the pixel block column 1410 (Ix*1/4) is divided by the 1D current accumulation value (Ix*3) corresponding to the load of the source driver in the 2D direction (horizontal direction). That is, the 2D voltage drop ratio of the pixel block B(0, 3) is the value of 1/4 divided by 3 (i.e., 1/12). Here, the 1D voltage drop ratio and the 2D voltage drop ratio corresponding to the pixel block B(0, 3) of FIG. 15 are collectively referred to as the voltage drop ratio Ratio(0, 0).

For the pixel block B(2, 2) of FIG. 15, the 1D voltage drop value of the pixel block B(2, 2) is the value after the current on the transmission line path P(2, 2) (corresponding to the current on the transmission line path P(0 2), that is, 3*Iy) is divided by the 1D summed load value corresponding to the load on a single transmission line TDL(10*Iy). That is, the 1D voltage drop ratio of the pixel block B(0, 3) is 3/10. The 2D voltage drop ratio of the pixel block B(2, 2) is the value after the current delivered by the source driver to a single pixel block in the pixel block column 1410 (Ix*1/4) is divided by the 1D summed load value corresponding to the load of the source driver in the 2D direction (horizontal direction) (Ix*3). That is, the 2D voltage drop ratio of the pixel block B(2, 2) is the value of ¼ divided by 3 (i.e., 1/12). Here, the 1D voltage drop ratio and the 2D voltage drop ratio corresponding to the pixel block B(2, 2) of FIG. 15 are collectively referred to as the voltage drop ratio Ratio(2, 2).

FIG. 16 is a schematic diagram of a load compensation lookup table 1610, a voltage drop ratio table 1620, and an updated lookup table 1630 according to the second embodiment of the invention. The load compensation lookup table 1610 of the present embodiment has the corresponding compensation values comp(0, 0) to comp(2, 3) of each of the pixel blocks B(0, 0) to B(2, 3) (such as the compensation values comp0 to comp2). The voltage drop ratio table 1620 has the calculated 1D voltage drop ratio and the 2D voltage drop ratio corresponding to each of the pixel blocks B(0, 0) to B(2, 3), which are called voltage drop ratio Ratio(0, 0) to Ratio(2, 3). In the present embodiment, the information between the load compensation lookup table 1610 and the voltage drop ratio table 1620 is multiplied to obtain the updated lookup table 1630. Specifically, in the present embodiment, each of the corresponding compensation values comp(0, 0) to comp(2, 3) of the pixel blocks B(0, 0) to B(2, 3) in the load compensation lookup table 1610 is multiplied by each of the corresponding voltage drop ratios Ratio(0, 0) to Ratio(2, 3) in the voltage drop ratio table 1620 to obtain each information in the updated lookup table 1630, for example, each updated compensation value comp(0, 0)' to comp(2, 3)' of the pixel blocks B(0, 0) to B(2, 3). The description and step flow shown in FIG. 16 may be implemented by the cooperation of the lookup table circuit 931 and the compensation value generation circuit 932 in the compensation circuit 230' of FIG. 9.

Figure 17:
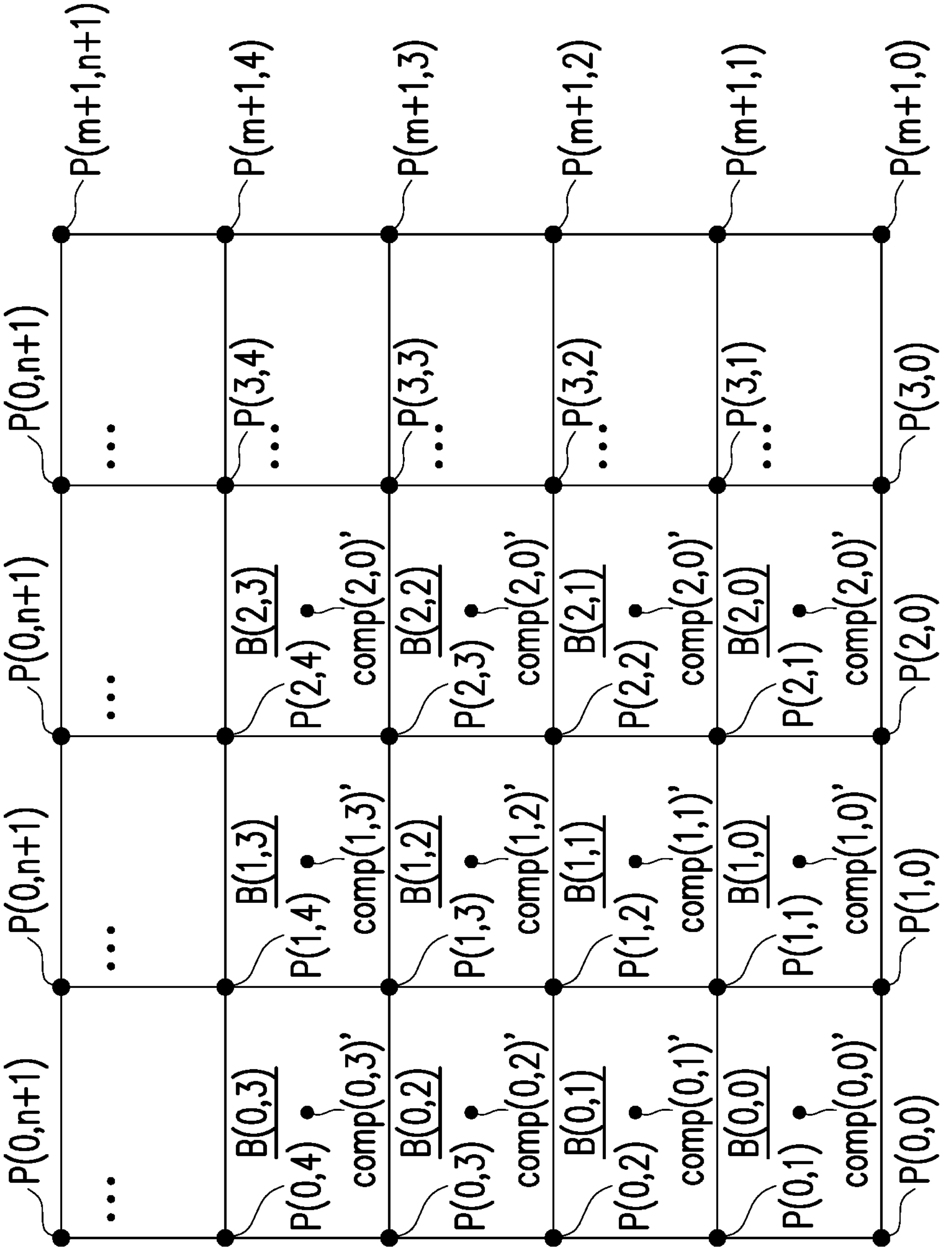
FIG. 17 is a schematic diagram of using a compensation value of each of the pixel blocks to compensate a grayscale value of the pixel block according to the second embodiment of the invention.

The compensation value generation circuit 932 of FIG. 9 may convert the second compensation value of the target pixel block into at least one pixel compensation value of the target pixel block. The present embodiment is explained accordingly with reference to FIG. 17. FIG. 17 is a schematic diagram of using a compensation value of each of the pixel blocks to compensate a grayscale value of the pixel block according to the second embodiment of the invention. FIG. 17 presents a plurality of pixel blocks on the panel (for example, the pixel blocks B(0, 0) to B(2, 3)). The compensation value of each of the pixel blocks B(0, 0) to B(2, 3) is obtained via the lookup table circuit 931 and the compensation value generation circuit 932 of FIG. 9. Here, the compensation values comp(0, 0)' to comp(2, 3)' are used to represent the compensation values of each of the pixel blocks B(0, 0) to B(2, 3). However, if the compensation values comp(0, 0)' to comp(2, 3)' are directly used to adjust the pixel blocks B(0, 0) to B(2, 3) accordingly, a color difference occurs at the boundary between the pixel blocks B(0, 0) to B(2, 3), thus producing a boundary effect. Therefore, in the present embodiment, via the interpolation or extrapolation calculation of the compensation values comp (0, 0)' to comp(2, 3)' of each of the pixel blocks B(0, 0) to B(2, 3), the compensation values comp(0, 0)' to comp(2, 3)' are extended to the four corner points of each of the pixel blocks B(0, 0) to B(2, 3), thus allowing the compensation value of each of the pixel blocks to be smoother to avoid a boundary effect. For example, the grayscale compensation value of the point P(0, 0) located in the lower left corner of the pixel block B(0, 0) may be calculated in a heterodyne manner using the compensation value comp(0, 0)' of the pixel block B(0, 0). The grayscale compensation value of the point P(0, 1) located in the upper left corner of the pixel block B(0, 0) may be calculated by calculating the grayscale compensation value corresponding to the midpoint between the point P(0, 1) and the point P(1, 1) using an interpolation method using the compensation values comp(0, 0)' and comp(0, 1)' of the pixel blocks B(0, 0) and B(0, 1), and then using the middle point and the compensation values comp(0, 0)' and comp(0, 1)' using a heterodyne method. The grayscale compensation value of the point P(0, 2) located in the upper left corner of the pixel block B(0, 1) may be calculated with reference to the point P(0, 1) by first calculating the grayscale compensation value corresponding to the midpoint between the point P(0, 2) and the point P(1, 2) using an interpolation method using the compensation values comp(0, 1)' and comp(0, 2)' of the pixel blocks B(0, 1) and B(0, 2), and then using the middle point and the compensation values comp(0, 1)' and comp(0, 2)' using a heterodyne method. The grayscale compensation value of point P(1, 1) located in the upper right corner of the pixel block B(0, 0) is calculated using the compensation values comp(0, 0)', comp(0, 1)', comp(1, 0)', and comp(1, 1)' of the surrounding pixel blocks B(0, 0), B(0, 1), B(1, 0), and B(1, 1) using linear interpolation. In other words, the corresponding grayscale compensation values of the points P(0, 0) to P(m+1, n+1) in FIG. 17 may all be calculated using the compensation values comp(0, 0)' to comp(2, 3)' of the pixel blocks B(0, 0) to B(2, 3).

The grayscale compensation circuit 933 is coupled to the compensation value generation circuit 932 to receive the pixel compensation value. The grayscale compensation circuit 933 may compensate the original grayscale data of the target pixel block using the pixel compensation value, so as to generate compensated grayscale data D2 of the target pixel block.

Based on the above, the display device of the above embodiments may convert the original grayscale data D1 into the current data, then convert the current data into the transmission line voltage drop information, and then convert the transmission line voltage drop information into the pixel compensation value, and compensate the original grayscale data DI using the pixel compensation value. Therefore, the display device may compensate for the voltage drop of the transmission line. Moreover, via the panel factor parameter, dynamic calculation of the load on the transmission line and the corresponding compensation value, and the use of interpolation/extrapolation to extend the compensation value to the four corner points of the pixel block, the compensation of the voltage drop phenomenon on the panel may be further implemented.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A display device, comprising:

a data conversion circuit, configured to convert a plurality of original grayscale data of a target pixel block into current data;

a voltage drop estimation circuit, coupled to the data conversion circuit to receive the current data of the target pixel block, and configured to convert the current data into transmission line voltage drop information of the target pixel block; and a compensation circuit, coupled to the voltage drop estimation circuit to receive the transmission line voltage drop information of the target pixel block, and configured to convert the transmission line voltage drop information into at least one pixel compensation value of the target pixel block and compensate the original grayscale data of the target pixel block using the at least one pixel compensation value to generate a plurality of compensated grayscale data of the target pixel block, wherein the data conversion circuit generates a plurality of color current average values according to the original grayscale data of the target pixel block, calculates the color current average values according to a panel factor parameter to generate a plurality of adjusted color current average values, and generates the current data of the target pixel block according to the adjusted color current average values, wherein a transmission line of a display panel of the display device corresponds to a plurality of pixel blocks of the display panel, the voltage drop estimation circuit is coupled to the data conversion circuit to receive the current data of each pixel group of the transmission line, the voltage drop estimation circuit accumulates the current data of the pixel groups of the transmission line along a reverse transmission direction of the transmission line to obtain a current accumulation value corresponding to each of the pixel groups, the voltage drop estimation circuit counts current accumulation values of the pixel groups of the transmission line along a transmission direction of the transmission line to learn a voltage drop characteristic value corresponding to each of the pixel groups, and the voltage drop estimation circuit calculates a voltage drop ratio using the voltage drop characteristic value of the target pixel block and a reference voltage drop characteristic value of the target pixel block.

2. The display device of claim 1, wherein the panel factor parameter is related to an ambient temperature of the target pixel block located on a display panel of the display device, a scanning pulse signal received by the target pixel block, a signal frequency, or a combination of the three.

3. The display device of claim 2, further comprising:

a temperature sensor, coupled to a panel factor index mapping circuit, and configured to sense the ambient temperature of the target pixel block to adjust the panel factor parameter.

4. The display device of claim 1, wherein the data conversion circuit comprises:

a brightness calculation circuit, configured to convert the original grayscale data of the target pixel block into a plurality of sub-pixel current values corresponding to a plurality of sub-pixels of the target pixel block based on a grayscale-to-current conversion curve;

a block averaging circuit, coupled to a current index mapping circuit to receive the sub-pixel current values, wherein the block averaging circuit is configured to perform an averaging calculation on the sub-pixel current values of the target pixel block according to a color to generate the plurality of color current average values of the target pixel block;

a panel factor index mapping circuit, coupled to the block averaging circuit to receive the color current average values of the target pixel block, wherein the panel factor index mapping circuit multiplies the color current average values of the target pixel block with the panel factor parameter to generate a plurality of adjusted color current average values of the target pixel block; and a color weighting circuit, coupled to the block averaging circuit to receive the adjusted color current average values, wherein the color weighting circuit performs a weighting calculation on the color current average values of the target pixel block to generate the current data of the target pixel block.

5. The display device of claim 1, wherein the data conversion circuit converts the original grayscale data of the target pixel block into a plurality of sub-pixel current values corresponding to a plurality of sub-pixels of the target pixel block based on a grayscale-to-current conversion curve, the data conversion circuit performs an averaging calculation on the sub-pixel current values of the target pixel block according to a color classification to generate the plurality of color current average values of the target pixel block, the data conversion circuit performs a weighting calculation on the adjusted color current average values of the target pixel block to generate the current data of the target pixel block.

6. The display device of claim 1, wherein the voltage drop estimation circuit calculates a load characteristic value corresponding to each of the pixel blocks according to a current accumulation value corresponding to each of the pixel blocks, queries at least one initial compensation value corresponding to the pixel blocks in a load compensation lookup table according to the load characteristic values of the pixel blocks, and dynamically calculates and updates the load characteristic value corresponding to each of the pixel blocks according to the at least one initial compensation value of the pixel blocks and the load characteristic value corresponding to each of the pixel blocks.

7. The display device of claim 6, wherein the voltage drop estimation circuit obtains a maximum compensation value corresponding to a maximum load and a minimum compensation value corresponding to a minimum load from the load characteristic values, wherein the voltage drop estimation circuit calculates a corresponding compensation value of each of the pixel blocks according to a current load value, the maximum compensation value corresponding to the maximum load, and the minimum compensation value corresponding to the minimum load.

8. The display device of claim 1, wherein the transmission line voltage drop information of the target pixel block comprises the voltage drop ratio.

9. The display device of claim 1, wherein the pixel groups of the transmission line are different pixel blocks of a same column of the display panel, and the reference voltage drop characteristic value comprises a maximum voltage drop characteristic value of the target pixel block in a case where each of the sub-pixels of all pixel blocks corresponding to the transmission line is a maximum grayscale.

10. The display device of claim 1, wherein, in a case where the transmission line is a data line of the display panel, the pixel groups of the transmission line are different pixel blocks of a same column of the display panel, and the voltage drop ratio is a 1D voltage drop ratio;

in a case where the transmission line is a source driver power line, the pixel groups of the transmission line are a plurality of pixel block columns of the display panel, and the voltage drop ratio is a 2D voltage drop ratio; and the transmission line voltage drop information of the target pixel block comprises at least one of the 1D voltage drop ratio and the 2D voltage drop ratio.

11. The display device of claim 1, wherein the voltage drop estimation circuit comprises:

a current accumulation circuit, coupled to the data conversion circuit to receive the current data of each of a plurality of pixel blocks of a display panel of the display device, wherein the current accumulation circuit accumulates the current data of the pixel blocks in a same pixel block column along a reverse transmission direction of a data line of the display panel to learn a current accumulation value corresponding to each of the pixel blocks in the same pixel block column, the current accumulation circuit sums the current data of all of the pixel blocks in any pixel block column to learn one column current data of each of a plurality of pixel block columns, and the current accumulation circuit accumulates the column current data of the pixel block columns along a reverse transmission direction of a source driver power line to learn a column current accumulation value corresponding to each of the pixel block columns;

a voltage drop calculation circuit, coupled to the current accumulation circuit to receive the current accumulation values and the column current accumulation values, wherein the voltage drop calculation circuit counts the current accumulation values of the pixel blocks in the same pixel block column along a transmission direction of the data line to learn a column voltage drop characteristic value corresponding to each of the pixel blocks in the same pixel block column, and the voltage drop calculation circuit counts the column current accumulation values of the pixel block columns along a transmission direction of the source driver power line to learn a row voltage drop characteristic value corresponding to each of the pixel block columns;

a 1D ratio circuit, coupled to the voltage drop calculation circuit to receive the column voltage drop characteristic values, wherein the 1D ratio circuit calculates a 1D voltage drop ratio corresponding to the target pixel block using the column voltage drop characteristic value of the target pixel block and a reference column voltage drop characteristic value of the target pixel block; and a 2D ratio circuit, coupled to the voltage drop calculation circuit to receive the row voltage drop characteristic values, wherein the 2D ratio circuit calculates a 2D voltage drop ratio corresponding to the target pixel block using the row voltage drop characteristic value of a target pixel block column corresponding to the target pixel block and a reference row voltage drop characteristic value of the target pixel block column, wherein the transmission line voltage drop information of the target pixel block comprises the 1D voltage drop ratio and the 2D voltage drop ratio.

12. The display device of claim 11, wherein the compensation circuit comprises:

a lookup table circuit, coupled to the voltage drop estimation circuit to receive the transmission line voltage drop information, wherein the lookup table circuit obtains at least one first compensation value corresponding to the target pixel block from at least one lookup table based on a position of the target pixel block, and the lookup table circuit calculates a second compensation value of the target pixel block using the at least one first compensation value and the transmission line voltage drop information of the target pixel block;

a compensation value generation circuit, coupled to the lookup table circuit to receive the second compensation value, wherein the compensation value generation circuit converts the second compensation value into the at least one pixel compensation value of the target pixel block; and a grayscale compensation circuit, coupled to the compensation value generation circuit to receive the at least one pixel compensation value, wherein the grayscale compensation circuit compensates the original grayscale data of the target pixel block using the at least one pixel compensation value, so as to generate the compensated grayscale data of the target pixel block.

13. The display device of claim 12, wherein the compensation circuit calculates Comp=Cmin+(Cmin−Cmax)*RID*R2D, wherein Comp represents the second compensation value, Cmin represents a minimum compensation value corresponding to a minimum load, Cmax represents a maximum compensation value corresponding to a maximum load, R1D represents the 1D voltage drop ratio, and R2D represents the 2D voltage drop ratio.

14. A grayscale compensation method of a display device, comprising:

converting a plurality of original grayscale data of a target pixel block into current data via a data conversion circuit of the display device;

converting the current data into transmission line voltage drop information of the target pixel block via a voltage drop estimation circuit of the display device;

converting the transmission line voltage drop information to at least one pixel compensation value of the target pixel block via a compensation circuit of the display device; and compensating the original grayscale data of the target pixel block using the at least one pixel compensation value via the compensation circuit to generate a plurality of compensated grayscale data of the target pixel block, wherein the step of converting the plurality of original grayscale data of the target pixel block into the current data comprises:

generating a plurality of color current average values according to the original grayscale data of the target pixel block;

calculating the color current average values according to a panel factor parameter to generate a plurality of adjusted color current average values; and generating the current data of the target pixel block according to the adjusted color current average values, wherein the step of converting the transmission line voltage drop information into the at least one pixel compensation value of the target pixel block via the compensation circuit of the display device comprises:

receiving the current data of each pixel group of the transmission line;

accumulating the current data of the pixel groups of the transmission line along a reverse transmission direction of the transmission line to learn a current accumulation value corresponding to each of the pixel groups;

counting the current accumulation values of the pixel groups of the transmission line along a transmission direction of the transmission line to learn a voltage drop characteristic value corresponding to each of the pixel groups; and calculating a voltage drop ratio using the voltage drop characteristic value of the target pixel block and a reference voltage drop characteristic value of the target pixel block.

15. The grayscale compensation method of claim 14, wherein the step of generating the plurality of color current average values according to the original grayscale data of the target pixel block comprises:

converting the original grayscale data of the target pixel block into a plurality of sub-pixel current values corresponding to a plurality of sub-pixels of the target pixel block based on a grayscale-to-current conversion curve; and performing an averaging calculation on the sub-pixel current values of the target pixel block according to a color classification to generate the plurality of color current average values of the target pixel block.

16. The grayscale compensation method of claim 14, wherein the panel factor parameter is related to an ambient temperature of the target pixel block located on a display panel of the display device, a scanning pulse signal received by the target pixel block, a signal frequency, or a combination of the three.

17. The grayscale compensation method of claim 14, wherein the step of converting the transmission line voltage drop information into the at least one pixel compensation value of the target pixel block via the compensation circuit of the display device further comprises:

calculating a load characteristic value corresponding to each of the pixel blocks according to a current accumulation value corresponding to each of the pixel blocks;

querying a load compensation lookup table according to the load characteristic values of the pixel blocks for at least one initial compensation value corresponding to the pixel blocks; and dynamically calculating and updating the load characteristic value corresponding to each of the pixel blocks according to the at least one initial compensation value of the pixel blocks and the load characteristic value corresponding to each of the pixel blocks.

18. The grayscale compensation method of claim 17, wherein converting the transmission line voltage drop information into the at least one pixel compensation value of the target pixel block via the compensation circuit of the display device further comprises:

obtaining a maximum compensation value corresponding to a maximum load and a minimum compensation value corresponding to a minimum load from the load characteristic values, wherein a corresponding compensation value of each of the pixel blocks is calculated according to a current load value, the maximum compensation value corresponding to the maximum load, and the minimum compensation value corresponding to the minimum load.

* * * * *